United States Patent
Persson

(10) Patent No.: US 11,663,237 B2
(45) Date of Patent: *May 30, 2023

(54) METHOD AND SYSTEM FOR DATA HANDLING

(71) Applicant: KING.COM LIMITED, St. Julians (MT)

(72) Inventor: Fredrik Persson, Stockholm (SE)

(73) Assignee: KING.COM LTD., St. Julians (MT)

( * ) Notice: Subject to any disclaimer, the term of this patent is extended or adjusted under 35 U.S.C. 154(b) by 0 days.

This patent is subject to a terminal disclaimer.

(21) Appl. No.: 17/504,912

(22) Filed: Oct. 19, 2021

(65) Prior Publication Data

US 2022/0035836 A1 Feb. 3, 2022

Related U.S. Application Data

(63) Continuation of application No. 16/451,362, filed on Jun. 25, 2019, now Pat. No. 11,163,796, which is a continuation of application No. 15/142,156, filed on Apr. 29, 2016, now Pat. No. 10,339,155.

(51) Int. Cl.
*G06F 16/27* (2019.01)
*G06F 16/23* (2019.01)
*H04L 67/1097* (2022.01)

(52) U.S. Cl.
CPC ........ *G06F 16/273* (2019.01); *G06F 16/2315* (2019.01); *G06F 16/2379* (2019.01); *G06F 16/278* (2019.01); *H04L 67/1097* (2013.01)

(58) Field of Classification Search
CPC .................................................. G06F 16/273
See application file for complete search history.

(56) References Cited

U.S. PATENT DOCUMENTS

| | | | |
|---|---|---|---|
| 2002/0059299 A1 | 5/2002 | Spaey | |
| 2012/0066263 A1 | 3/2012 | Wildermuth | |
| 2012/0265726 A1 | 10/2012 | Padmanabhan et al. | |
| 2014/0012814 A1 | 1/2014 | Bercovici et al. | |

(Continued)

OTHER PUBLICATIONS

International Search Report, dated Jul. 19, 2017, and Written Opinion issued in International Application No. PCT/EP2017/059297, dated Jul. 19, 2017.

(Continued)

*Primary Examiner* — Van H Oberly
(74) *Attorney, Agent, or Firm* — Saul Ewing LLP

(57) ABSTRACT

A method of transferring data between database locations comprising: providing a location reference comprising location values of one or more data collections stored in a database; providing an indicator in association with at least one data collection of the one or more data collections, the indicator being provided in response to initiation of a transfer process of the at least one data collection from a first location of the database to a second location of the database; wherein the indicator is changeable between a first state and a second state, the first state being indicative of the initiation of the transfer process; and as part of the transfer process of the at least one data collection, selectively updating a location value of the at least one data collection in the location reference, in dependence on a determination of whether the indicator is in the first state or the second state.

25 Claims, 25 Drawing Sheets

(56) References Cited

U.S. PATENT DOCUMENTS

| | | |
|---|---|---|
| 2015/0254257 A1 | 9/2015 | Kritchko et al. |
| 2016/0191365 A1* | 6/2016 | Wakeman ............ H04L 41/0856 709/224 |
| 2017/0235760 A1* | 8/2017 | Sharpe ................ G06F 11/0751 707/827 |

OTHER PUBLICATIONS

Anonymous, "On-Line Data Redistribution in a Shred-Nothing Parallel Database System", IBM Technical Disclosure Bulletin, International Business Machines Corp. vol. 40, No. 1, pp. 157-160 XP000686133, Jan. 1, 1997.

Elmore, Aaron J., et al., "Squall: Fine-Grained Live Reconfiguration for Partitioned Main Memory Databases", Proc. 2015 ACM Sigmod Intl. Conf. on Mgme. of Data, Sigmod '15, pp. 299-313 New York, NY XP055387799, May 27, 2015.

Goulah, John, "The Shard Revisited, Tools and Techniques Used at Etsy", Retrieved from the Internet: URL: https://www.percona.com/live/london-2013/sites/default/files/slides/percona-tools_0.pdf [retrieved on Jul. 5, 2017] XP055387975, Nov. 12, 2013.

\* cited by examiner

| User I.D. | Data collection location |
|---|---|
| User 1 | 1 |
| User 2 | 2 |
| User 3 | 1 |
| User 4 | 3 |
| User 5 | n |

Figure 7

| User I.D. | Data collection location | Move Flag |
|---|---|---|
| User 1 | 1 | ▲ |
| User 2 | 2 | |
| User 3 | 1 | ▲ |
| User 4 | 3 | ▲ |
| User 5 | n | |

Figure 9

| User I.D. | Data collection location | Move Flag |
|---|---|---|
| User 0 | 1 | |
| User 1 | 2 | |
| User 2 | 1 | ▲ |
| User 3 | 3 | ▲ |
| User 4 | 4 | |
| User 6 | 2 | |
| User 7 | 1 | |

Figure 22

METHOD AND SYSTEM FOR DATA HANDLING

CROSS-REFERENCE TO RELATED APPLICATIONS

This is a continuation of U.S. application Ser. No. 16/451,362, filed on Jun. 25, 2019, which is a continuation of U.S. application Ser. No. 15/142,156, filed on Apr. 29, 2016, the entire contents of which being fully incorporated herein by reference.

TECHNICAL FIELD OF THE INVENTION

Some embodiments relate to a method and system for data handling in a database server system comprising at least one database server. The database server may be used to handle data requests for the purposes of providing information to and/or receiving information from computer software running on a client device.

BACKGROUND OF THE INVENTION

In computing it is commonplace to communicate over a network to provide functionality or additional functionality to a client device and/or to a server serving the client device. It may be the case that such a server comprises a database for storing data related to the client devices. Such data may relate to users of the client devices, such as user profile information. Where a server or network serves a large number of users and/or a large amount of traffic per user, there may be a high volume of data requests to the database of the server. High traffic to a database can cause delays and affect stability of the database. This can also lead to end-user frustration if it prevents an end user from being able to access the data required for a task.

By way of example, one application where a server or servers need to serve a large number of users is that of computer gaming. A user may require data to be received from or sent to the server(s), for example when playing a game.

SUMMARY OF THE INVENTION

According to a first aspect there is provided a method of transferring data between database locations comprising: providing a location reference comprising location values of one or more data collections stored in a database; providing an indicator in association with at least one data collection of the one or more data collections, the indicator being provided in response to initiation of a transfer process of the at least one data collection from a first location of the database to a second location of the database; wherein the indicator is changeable between a first state and a second state, the first state being indicative of the initiation of the transfer process; and as part of the transfer process of the at least one data collection, selectively updating a location value of the at least one data collection in the location reference, in dependence on a determination of whether the indicator is in the first state or the second state.

According to some embodiments, the location value is selectively updated to show that the at least one data collection is located in the second location, when it is determined that the indicator is in the first state.

According to some embodiments, the location value for the at least one data collection is not updated if it is determined that the indicator is in the second state.

According to some embodiments, the transfer process comprises copying the at least one data collection from the first location to the second location.

According to some embodiments, following the transfer process the at least one data collection is deleted from the first location when it is determined that the indicator is in the first state.

According to some embodiments, if it is determined that the indicator is in the second state, the method comprises deleting from the second location any data of the at least one data collection that has been copied to the second location.

According to some embodiments, the method comprises re-trying the transfer process at a later time if it is determined that the indicator is in the second state.

According to some embodiments, the method comprises receiving a lookup request from a requester, and in response to the lookup request providing the location value of the at least one data collection to the requester.

According to some embodiments, the indicator is changed from the first state to the second state in response to a lookup request for the at least one data collection.

According to some embodiments, the method supports lookup requests of a first importance level and lookup requests of a second importance level, wherein the first importance level is a higher level of importance than the second importance level, and wherein the indicator is changed from the first state to the second state in response to a lookup request of the first importance level and is not changed in response to a lookup request of the second importance level.

According to some embodiments, said database comprises a plurality of shards, the first location comprising a first shard and the second location comprising a second shard.

According to some embodiments, the database comprises a hierarchical structure comprising at least a first level and a second level, the second level being higher than the first level.

According to some embodiments, updates made at the second level are propagated to the first level.

According to some embodiments, a lookup request for the location value of the at least one data collection is passed from the first level to the second level, if the first level has insufficient data to respond to the request.

According to some embodiments, the first level of the database comprises a local cache, and the method comprises delaying a transfer of the at least one data collection from the first location to the second location for a predetermined period, so as to enable flushing of existing information from the local cache before the transfer is carried out.

According to some embodiments, the first state comprises a presence of the indicator, and the second state comprises an absence of the indicator.

According to some embodiments, the indicator comprises a flag.

According to some embodiments, the location reference comprises a lookup table.

According to some embodiments, the method comprises an atomic transaction.

According to some embodiments, the determination of whether the indicator is in the first state or the second state is carried out after the initiation of the transfer process.

According to some embodiments, the determination of whether the indicator is in the first state or the second state is carried out a pre-determined time after the initiation of the transfer process.

According to some embodiments, the determination of whether the indicator is in the first state or the second state is carried out in response to receiving a request for the at least one data collection.

In a second aspect there is provided an apparatus comprising: at least one memory and at least one processor, the at least one memory and the at least one processor configured to cause the apparatus to: provide a location reference comprising location values of one or more data collections stored in a database; provide an indicator in association with at least one data collection of the one or more data collections, the indicator being provided in response to initiation of a transfer process of the at least one data collection from a first location of the database to a second location of the database; wherein the indicator is configured to be changeable between a first state and a second state, the first state being indicative of the initiation of the transfer process; and as part of the transfer process of the at least one data collection, selectively update a location value of the at least one data collection in the location reference, in dependence on a determination of whether the indicator is in the first state or the second state.

According to some embodiments, the apparatus is configured to selectively update the location value to show that the at least one data collection is located in the second location, when it is determined that the indicator is in the first state.

According to some embodiments, the apparatus is configured to not update the location value for the at least one data collection if it is determined that the indicator is in the second state.

According to some embodiments, the apparatus is configured to copy the at least one data collection from the first location to the second location as part of the transfer process.

According to some embodiments, following the transfer process the apparatus is configured to delete the at least one data collection from the first location when it is determined that the indicator is in the first state.

According to some embodiments, the apparatus is configured to delete from the second location any data of the at least one data collection that has been copied to the second location, if it is determined that the indicator is in the second state.

According to some embodiments, the apparatus is configured to re-try the transfer process at a later time if it is determined that the indicator is in the second state.

According to some embodiments, in response to receiving a lookup request from a requester, the apparatus is configured to provide the location value of the at least one data collection to the requester.

According to some embodiments, the apparatus is configured to change the indicator from the first state to the second state in response to a lookup request for the at least one data collection.

According to some embodiments, the apparatus is configured to support lookup requests of a first importance level and lookup requests of a second importance level, wherein the first importance level is a higher level of importance than the second importance level, and wherein the indicator is changed from the first state to the second state in response to a lookup request of the first importance level and is not changed in response to a lookup request of the second importance level.

According to some embodiments, said database comprises a plurality of shards, the first location comprising a first shard and the second location comprising a second shard.

According to some embodiments, the database comprises a hierarchical structure comprising at least a first level and a second level, the second level being higher than the first level.

According to some embodiments, the apparatus is configured to propagate updates made at the second level to the first level.

According to some embodiments, the apparatus is configured to pass a lookup request for the location value of the at least one data collection from the first level to the second level, if the first level has insufficient data to respond to the request.

According to some embodiments, the first level of the database comprises a local cache, and the apparatus is configured to delay a transfer of the at least one data collection from the first location to the second location for a predetermined period, so as to enable flushing of existing information from the local cache before the transfer is carried out.

According to some embodiments, the first state comprises a presence of the indicator, and the second state comprises an absence of the indicator.

According to some embodiments, the indicator comprises a flag.

According to some embodiments, the location reference comprises a lookup table.

According to some embodiments, the method comprises an atomic transaction.

In a third aspect there is provided a non-transitory computer readable medium comprising computer executable instructions, which when run by at least one processor is configured to perform: providing a location reference comprising location values of one or more data collections stored in a database; providing an indicator in association with at least one data collection of the one or more data collections, the indicator being provided in response to initiation of a transfer process of the at least one data collection from a first location of the database to a second location of the database; wherein the indicator is changeable between a first state and a second state, the first state being indicative of the initiation of a transfer process; and as part of the transfer process of the at least one data collection, selectively updating a location value of the at least one data collection in the location reference, in dependence on a determination of whether the indicator is in the first state or the second state.

According to some embodiments, the location value is selectively updated to show that the at least one data collection is located in the second location, when it is determined that the indicator is in the first state.

BRIEF DESCRIPTION OF DRAWINGS

To understand some embodiments, reference will now be made by way of example only to the accompanying drawings, in which:

FIG. 7 shows a look-up table according to an embodiment;

FIG. 9 shows a look-up table according to an embodiment;

FIG. 22 shows a look-up table according to an embodiment;

DETAILED DESCRIPTION OF SOME EMBODIMENTS

Figure 1:
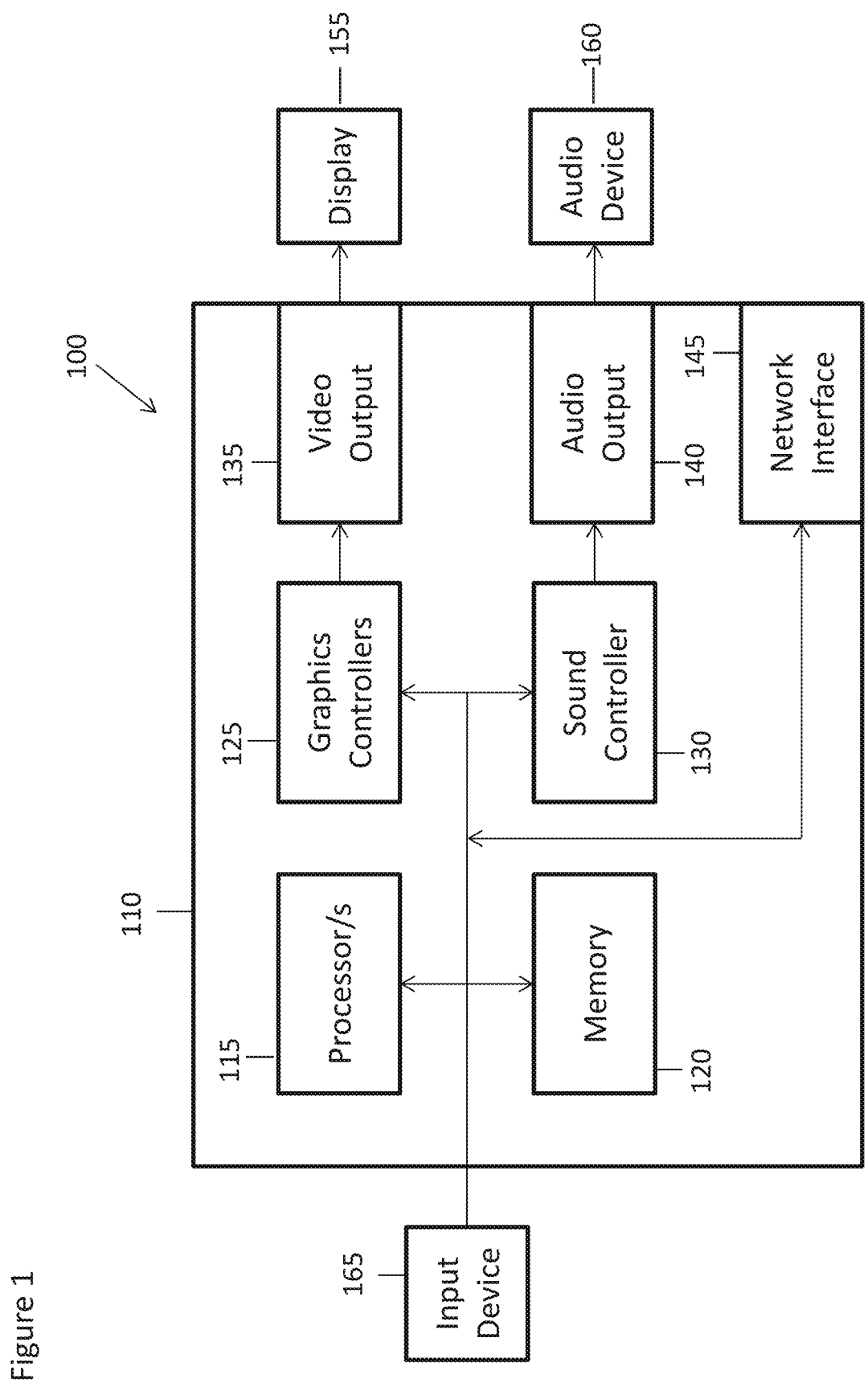
FIG. 1 shows an example computing device of an embodiment.

A schematic view of a user device 100 according to an embodiment is shown in FIG. 1. All of the blocks shown are implemented by suitable circuitry. The blocks may be implemented in hardware and/or software. The user device may have a control part 110. The control part 110 has one or more processors 115 and one or more memories 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
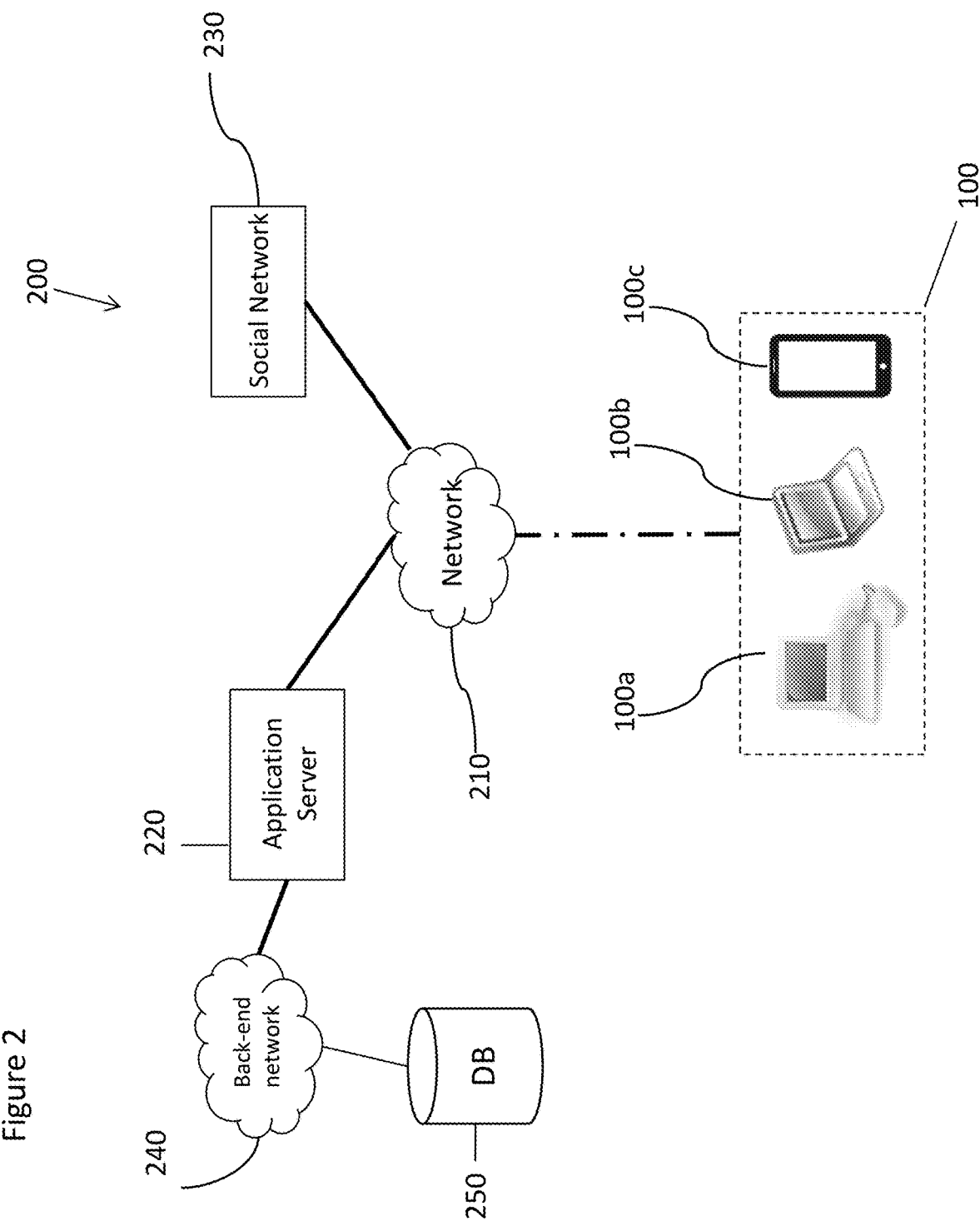
FIG. 2 illustrates an example system in which some embodiments may be provided.

FIG. 2 schematically shows a system 200 in some embodiments. The system 200 comprises an application server 220 which may store or be in communication with database 250 which which may comprise information on game player's details, profiles, statistics, etc. In practice, one or more databases 250 may be provided, as well as one or more application servers 220. Where more than one server 220 is provided, the database(s) 250 may be provided in one database 250 or in databases across two or more servers 220. In some embodiments the application server 220 may provide functions to one or more client user devices. In some embodiments the application server 220 may also have a games data function. This may comprise one or more units of memory to store the computer game program and user behaviour data, and a processor to run the games program and process the user behaviour data.

The server 220 may communicate via for instance the Internet 210 to one or more user devices 100, shown in the Figure by way of example as user devices 100a, 100b and 100c, and may further provide connections to a social network 230.

In some embodiments the back-end network 240 may be the same as network 210, optionally with logical/security separations as those known to the person skilled in the art.

Figure 3:
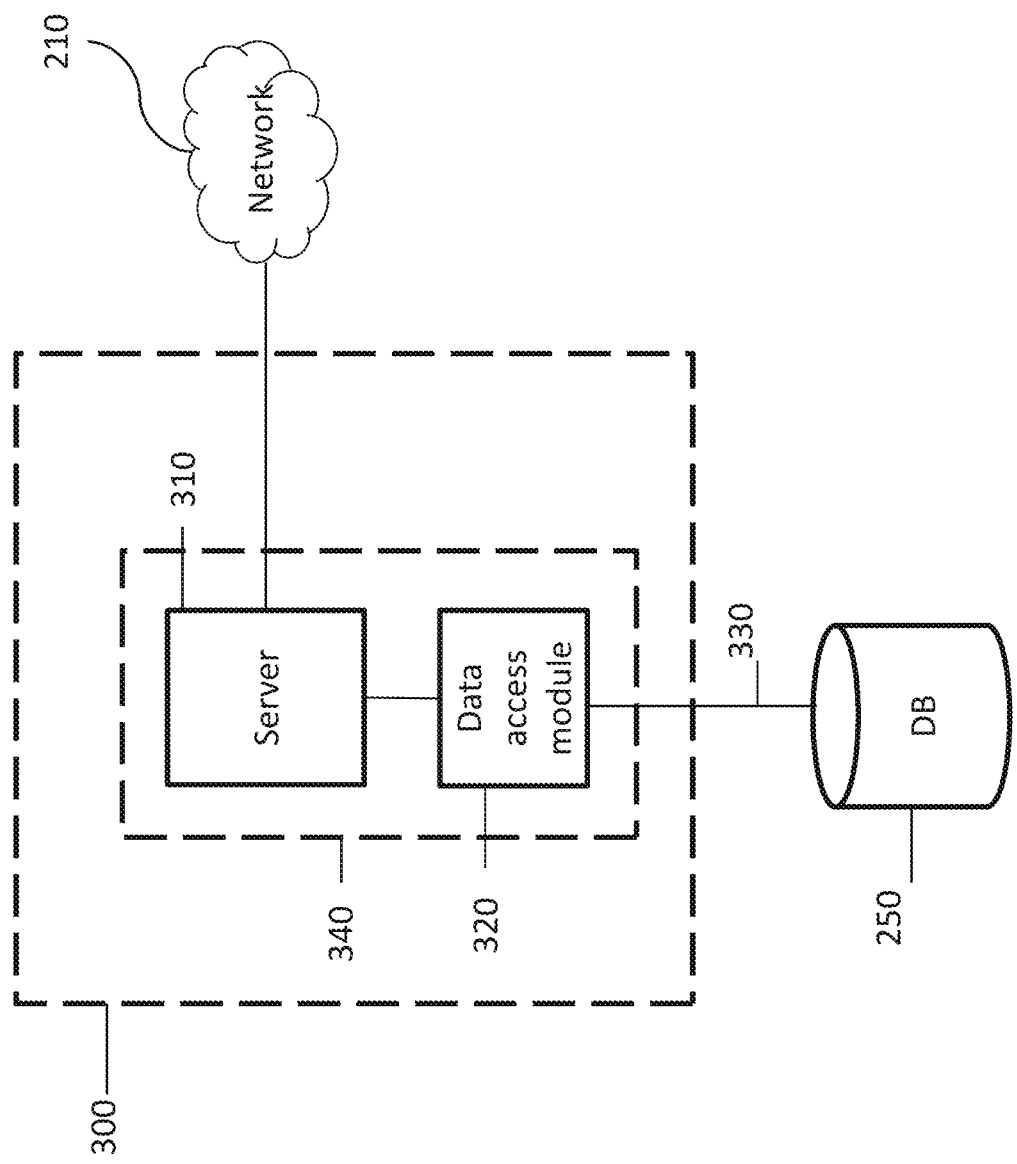
FIG. 3 shows a back-end system according to some embodiments.

FIG. 3 illustrates an application server 300 according to an embodiment, comprising of a server 310 in communication with or connected to a control or data access module 320. The data access module 320 may be implemented as part of server 310, or may be a separate module 320 external to and connected with the server 310. The server 310 may be one of many servers, such as those known to the person skilled in the art as a server farm 340, or rack.

The server 310 or server farm 340 may be connected as shown to database 250 via link 330. Link 330 may be wired, wireless and/or provided via or through networks such as a backend network, as known to those persons skilled in the art. The control module 320 provides control and update of data in the database(s) 250.

The database 250 may comprise information regarding one or more users and/or one or more client devices. For conciseness the term "user" or "users" may also encompass a client device of that user or those users, unless specifically described otherwise. In practice, the database 250 may comprise information regarding many users. For example the database 250 may comprise information on thousands, may be even millions of users. The information stored in the database may be in the form of one or more data records. Each user may have a respective data record associated therewith.

Figure 4:
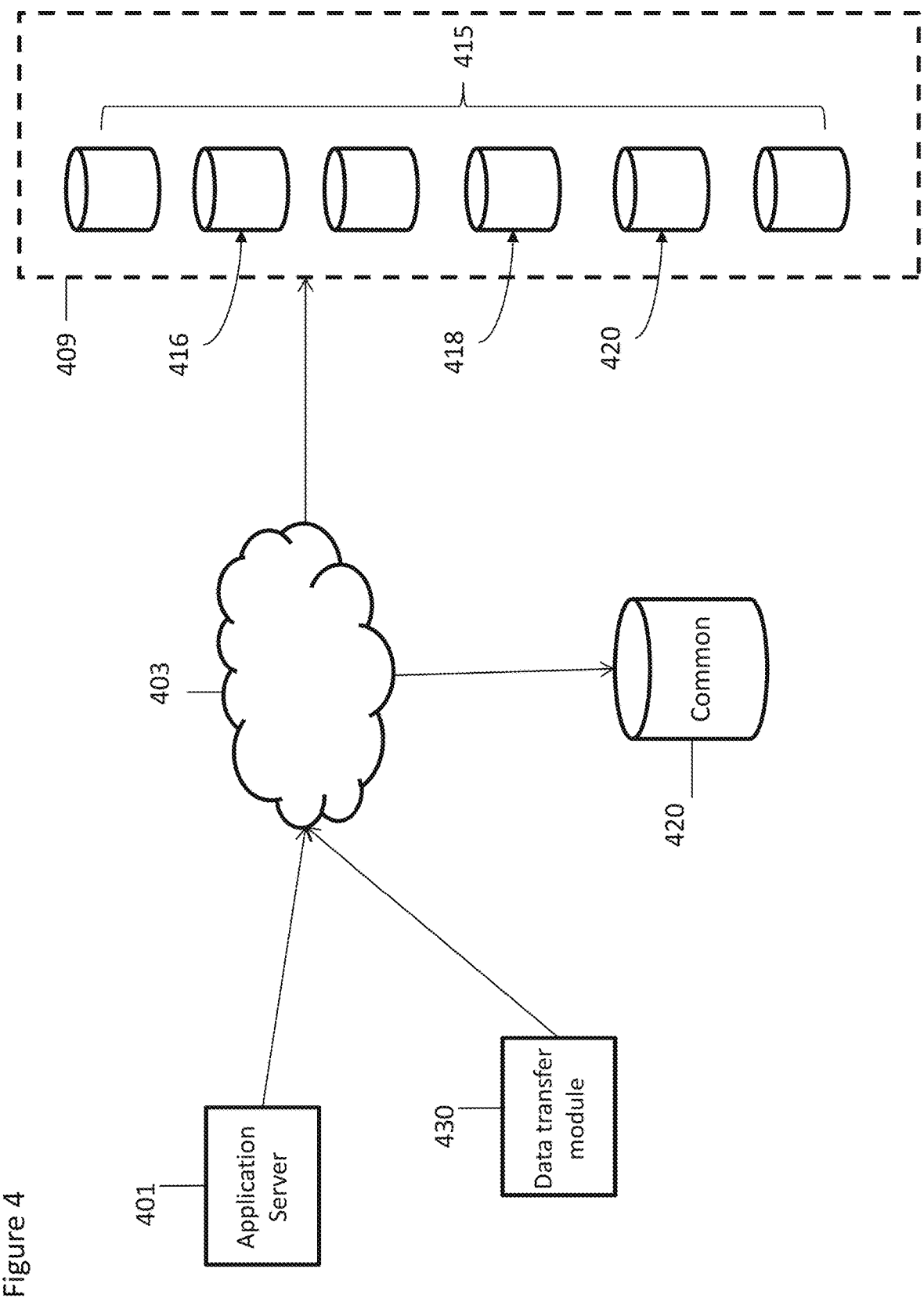
FIG. 4 shows an example system of an embodiment.

Reference is now made to FIG. 4 which shows a system according to an embodiment. A server 401 is connected to a database 409 over network 403. Network 403 may be the back-end network or the like.

Database layer 409 comprises a plurality of servers 415. In case the application server stores user specific data, the database may comprise user profile information. For example the user profile information may include (by way of non-limiting example): identity information; address information; location information; payment and/or billing information (e.g. credit card details); game related information etc. of one or more users.

A client device or server may request a single record from the database by sending a 'select' or 'get' request for a single record. Alternatively a server may request a plurality of data records. Accordingly a 'select' request may be transmitted for a plurality of records. The plurality of records may be a list of records and/or a range of records. The records may be in the form of "keys". A key may comprise an identifier which enables a record to be identified in the database. In some embodiments a key may comprise a unique identifier. In addition to the 'select' request, the server may request modifications of stored data in the database by using data manipulation operations such as 'update', 'insert' and 'delete' requests as those known to the person skilled in the art.

Information in the database may be partitioned. The information may be partitioned within a server or across servers, or a combination of both. That is the database may be considered to comprise one or more parts. These parts may alternatively be referred to as "shards". Partitioning the database in this manner may facilitate storage of large amounts of information. Partitioning in this manner may also improve reliability of storage and/or retrieval of information. For example if one shard nears or reaches capacity, then information can be transferred to another shard which has capacity to receive more information. Also, if one shard becomes inoperable then the system may still be able to operate satisfactorily using the other shards.

In the embodiment of FIG. 4 the database 409 is partitioned into a plurality of servers 415. In this embodiment a separate common database 420 may be used to store information about where data is located. The information about data location may in some embodiments be stored in the common database 420 in the form of a look-up table (LUT). The lookup may resolve the location (by way of non-limiting example) for users or client devices.

In some embodiments, the common database 420 may also be partitioned.

Figure 5:
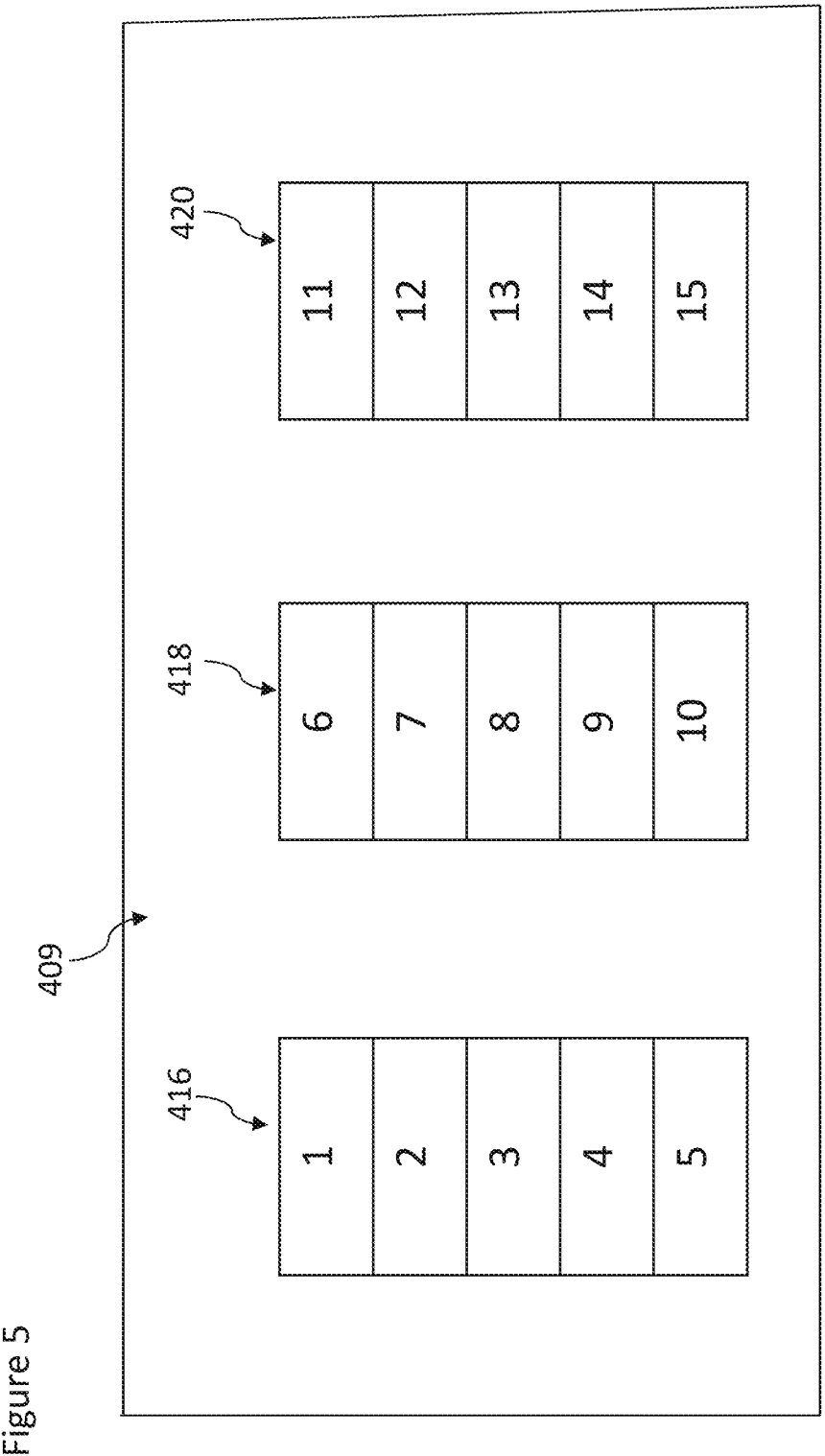
FIG. 5 schematically shows the partitioning of a database according to an embodiment.

FIG. 5 illustrates partitioning within a database according to a simplified example. The database is shown generally at 409. In this example the database comprises (by way of example only) three shards, namely shards 416, 418 and 420. It will of course be understood that the database could comprise any number of shards. That is the database may comprise n shards. In this example shard 416 comprises data records or data collection 1 to 5, shard 418 comprises data collection 6 to 10, and shard 420 comprises data collection 11 to 15. This is by way of example only, and each shard may comprise a different number of data collections. Each data collection consists of multiple data records associated with one (or a group of) users and/or one (or a group of) client devices. In at least some embodiments the data collections do not have to be stored in a consecutive manner. It will also be understood that each storage location in a shard may store more than one data collection. In some embodiments some or all of the shards may have a different capacity. In FIG. 5 each shard is shown to be full. It will be understood that one or more of the shards may not be full at any given time i.e. one or more of the shards may have spare capacity at any given time. This is shown for example in FIG. 6.

Figure 6:
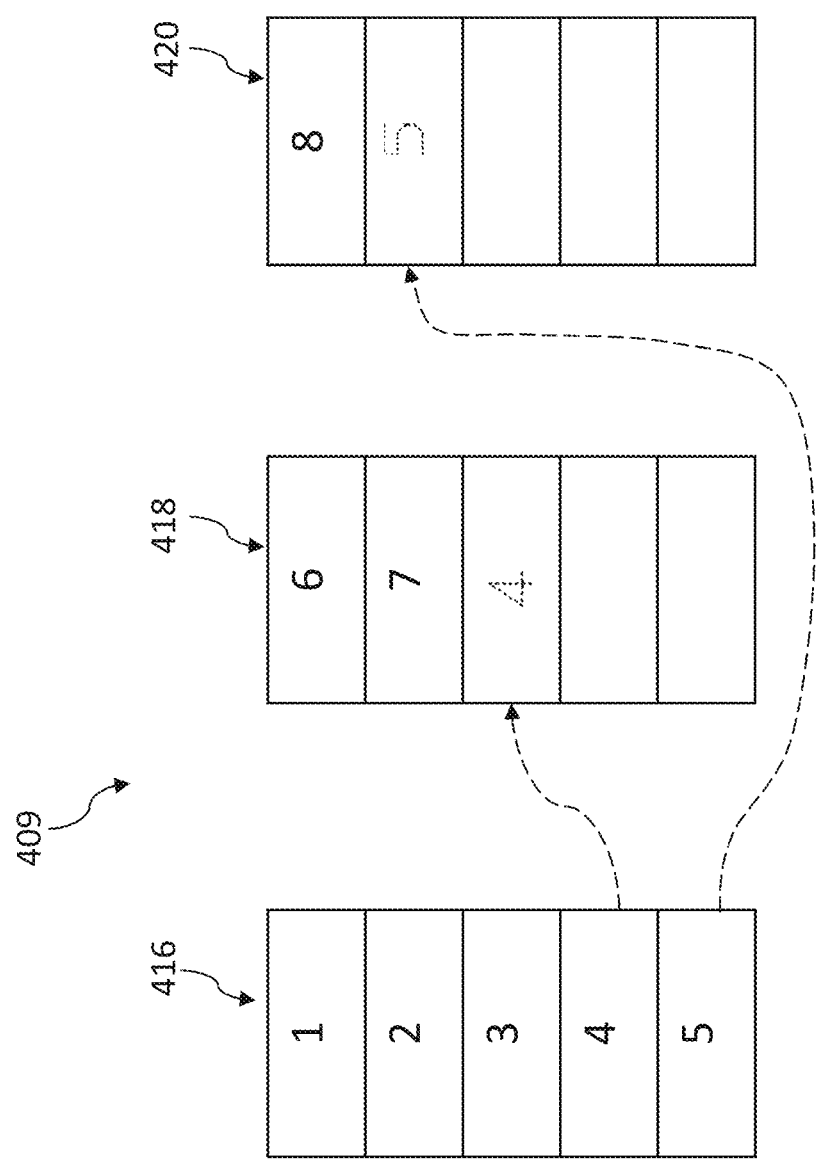
FIG. 6 schematically shows data moving in a partitioned database, according to an embodiment.

In FIG. 6, shard 416 contains collection 1 to 5. Shard 416 may be considered to be at or near its capacity. Shard 418 contains collection 6 and 7. Shard 418 has spare capacity. Shard 420 contains collection 8 only. Shard 420 has spare capacity. In order to distribute the storage load, the collections can be moved or transferred between the shards. As shown by the dotted lines, collection 5 is transferred from shard 416 to shard 420. Data collection 4 is transferred from shard 416 to shard 418.

In addition to size capacity, there can be a number of reasons to move data collections between shards. For example data collections may be moved between shards to help control load capacity and/or network capacity. Additionally or alternatively data collections may be moved between shards for hardware cost optimization. Additionally or alternatively data collections may be moved between shards due to user/device co-location etc.

It will be understood that in addition to transferring data collections individually, data collections can also be transferred in groups or sets. That is multiple collections can be transferred at the same time. In some embodiments different collections within a set of collections being transferred can be transferred to different shards, if need be.

In an embodiment such as that in FIG. 4 where database 409 is partitioned into shards, one or more look-up tables (LUTs) may be employed such that when a request for data collection access occurs, then the LUT(s) can be used to determine where that data collection is stored. Such an LUT may be stored for example in the common database 420 and such an LUT may indicate at which shard the data collection is stored.

An exemplary LUT 800 is shown in FIG. 7. The LUT comprises a first column 702. The first column 702 comprises a list of User IDs. In this example, for illustrative purposes only, five user IDs are shown in column 1, namely IDs of User 1 to User 5. It will of course be understood that in practice there may be many more users, and that other keys than user IDs may be used. A second column 704 comprises information of a location of a data collection for that user. For example this may be a shard number. Each entry in column 704 may be considered an indicator. The indicator may be indicative of a status of that data record. The status may be location information of the location of a data record for that user in the common database. In the example of FIG. 7 it is shown that the data collection for User 1 is stored in shard 1, data collection for User 2 is stored in shard 2, data collection for User 3 is stored in shard 1, data collection for User 4 is stored in shard 3, and data collection for User 5 is stored in Shard n. For example the indicator 706 in column 704 is indicative that the data collection for user 2 is in shard 2. The LUT may also comprise further columns relating to further information fields for each user.

An application server 401 may need to retrieve user information from the database or write user information to the database. By way of example only, if a game is being played then the application server 401 may need to obtain game related information. For example the game related information may be a number of credits that a user has or a game level that a user is on. The application server 401 may need to obtain this information from the database, in which case knowledge of the location of that user's information is required so that it can be retrieved.

For example, an application server 401 may need to obtain user information for User 2. The application server 401 may therefore make a get or select request for information for User 2. Utilising the LUT of FIG. 7 it can be seen that the data collection for User 2 is in shard 2. Accordingly the records wanted from the data collection can be retrieved from Shard 2 by application server 401 as necessary.

Figure 8:
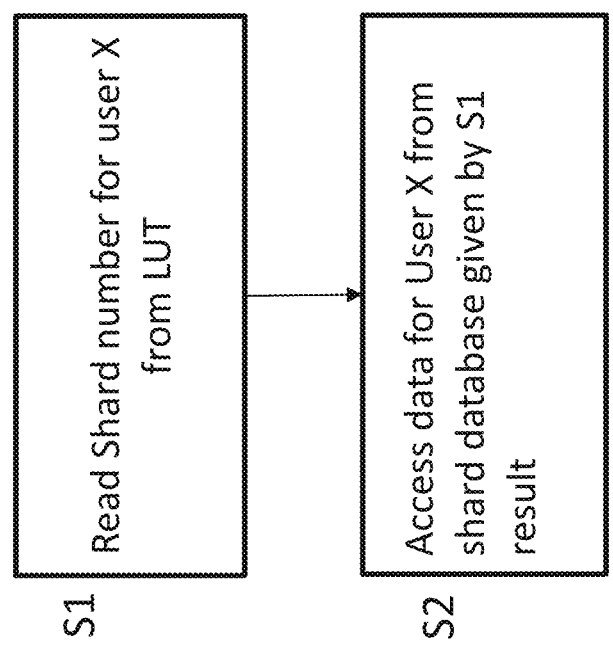
FIG. 8 is a flow-chart according to an embodiment.

FIG. 8 is a flow chart illustrating how a data access module (e.g. data access module 320 in FIG. 3) and application server may perform their work. Before any access to a data collection, the data access module queries the LUT in the common database and uses the resulting shard as the location for the data collection. As shown in step S1 of FIG. 8, a shard number for user X is read from the LUT. In step S2 data for user X is accessed from the shard database given by the result from step S1.

An application server may also need to upload information to the database shards. Similarly, the shard location for that user also needs to be known in that scenario.

The present inventors have realised that there may be difficulties associated with storing large quantities of data records in databases. This may in particular be the case where the database(s) needs to be accessible at all times. This may be the case where data collections are associated with a large number of users/clients that also may be geographically spread. For example it may not be appropriate to shut down the databases during the night and/or weekends to perform database maintenance. As explained above, it might be necessary to transfer data collections between shards for multiple reasons. If a user or device is locked out from a data collection whilst it is being transferred then this may frustrate a user who needs to access that information at that time, or if information needs to be uploaded at that time. For example, in case the application server comprises a games data function the information may need to be accessed in order to download a game, to start or play a game, or to carry out a certain action in a game. Failure to be able to carry out the action at that moment may cause user frustration, leading to the user giving up and not completing the action in question. As will be explained in further detail below, at least some embodiments enable access to data collection(s) in a database or databases whilst those data collection(s) are undergoing a moving process. Furthermore, the data collection(s) in question can then be retrieved and/or written to as necessary.

A process of moving one or more collections between shards may be in response to receiving an external instruction to move the one or more collections. Alternatively or additionally, a moving process may automatically occur in response to a pre-defined parameter. For example a pre-defined parameter may be a threshold capacity level. By way of example only a first shard may be configured to offload some data collections to a second shard when the first shard reaches 80% capacity. The system may be configured to move the information to a second shard whose capacity is below a certain threshold level. For example, the system may be configured to look to move the data collections to a shard that is running at or below 50% capacity.

A process of moving a data collection from one shard to another may in some embodiments involve three databases: the source shard, destination shard and common database. As an example using FIG. 4, the application server 401 may at any moment request the LUT for User 4 from common database 420, resolving into the existing shard located on shard 416. If data collection for User 4 is to be moved to shard 418, and no lock-out time is acceptable, the copy of data collection for User 4 from shard 416 to 418 as well as the change of LUT in 420 must in theory occur instantly and be atomically consistent, which may not be practically possible.

As known to the person skilled in the art, databases may support operations that provide such instantly and atomically consistent operations, called database transactions, but those transactions are executed within a single database location. Therefore such known techniques do not support moving data collections between database locations (e.g. between database shards) and making the corresponding LUT updates, in atomically consistent transactions (e.g. as part of a single transaction)

As is also known to a person skilled in the art, there is distributed transaction support that may coordinate, for example, data updates on all three databases, but such distributed transactions have several drawbacks that may not be acceptable, such as license cost, capacity cost, consistency relaxation and processing overhead.

A process of moving a data collection from a source shard to a destination shard while maintaining and updating a LUT in the common database, that at any time can be used to access the data, may involve modification of the data access module 320 in the application server and/or adding a data transfer module 430 that performs (or coordinates) the move. The data transfer module 430 may be built into application server 401, common database 420, or database 409.

The LUT may be complemented with an additional move indicator or marker, as shown in FIG. 9 for example. In the example of FIG. 9 the marker or indicator is in the form of a flag. It will be understood however that the marker can take any form. For each row, the move flag indicates if the data collection for a respective user is currently in the process of being moved.

Figure 24:
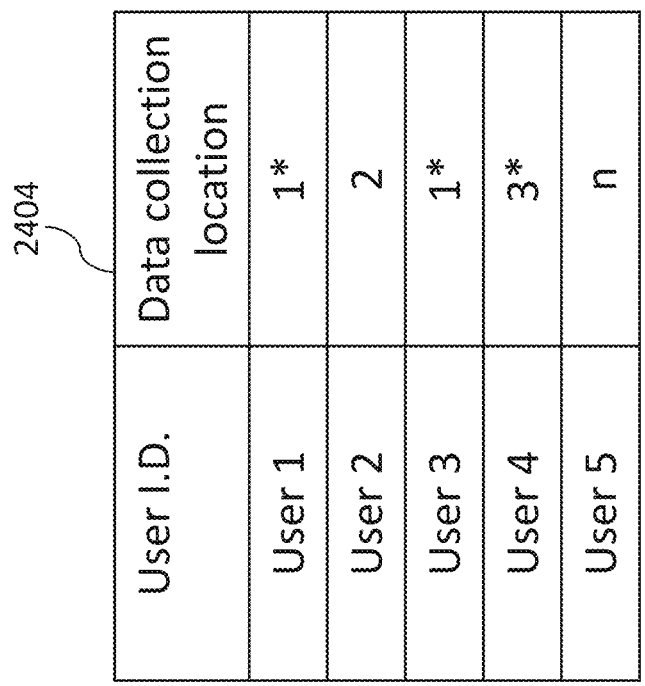
FIG. 24 shows a look-up table according to an embodiment.

It will be understood that the "flag" or "marker" representative of a move of data can be represented in other ways. For example, rather than a flag any other type of symbol or marker can be used such as a minus sign (−), a star (*) etc. In some embodiments a separate "Move Flag" column does not have to be provided. For example a comparison can be made between FIG. 9 and FIG. 24. In FIG. 24 there is no "Move Flag" column. Instead, a move of a data collection of a respective user is represented by a star (*) in data collection location column 2404.

In some embodiments the move flag can be part of a freeform string. In other words the flag can be any type of character, or part of a string of any type of characters. The string does not have to be of a fixed length or value.

In some embodiments the flag may be in the form of a value or value range of shard values. For example, the flag may be a permutation of a shard value. For example, if a data collection is stored in shard 15, and a move for that data collection to shard 20 is initiated then the shard value for that data collection may be temporarily changed from 15 to 1015 in the LUT (i.e. a permutation of the original shard value). If the move is successful then the shard value is updated to 20. If the move fails then the shard value reverts to 15. Where a move for a number of data collections has been initiated, then shard values for each of those collections may be updated in the manner discussed above. For example, if a move is initiated for shard values 1 to 99 as part of a move operation, those shard values may be changed to 1001 to 1099 to show that those moves have been initiated.

The indicator may represent a block or range of LUT entries. For example a single indicator may represent more than one data collection and its corresponding shard value in a LUT. This is described in more detail with respect to FIG. 22.

Figure 10:
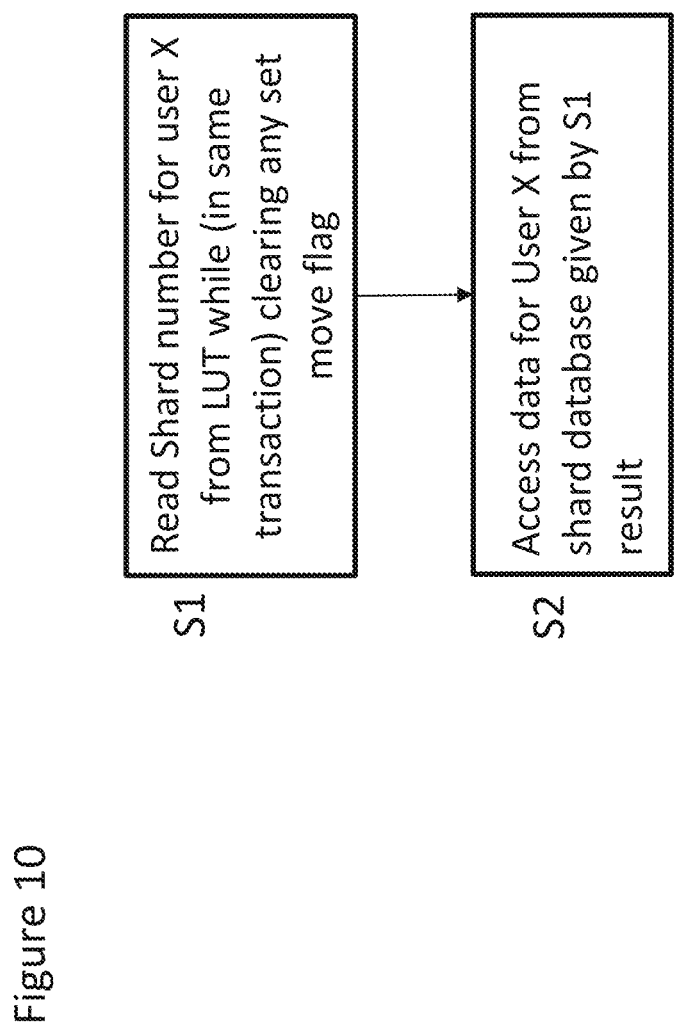
FIG. 10 is a flow chart according to an embodiment.

FIG. 10 illustrates how the Data Access module 320 in an application server is updated to handle the move flag in the LUT. For every lookup, the data access module clears the move flag if it is set. Note that the flag is cleared as part of the transaction. That is the flag is cleared as part of the transaction involving the lookup. In other words the move flag is cleared as part of an atomic transaction including the lookup request. Therefore in some embodiments it may be considered that the flag is cleared in response to receiving the lookup request. The atomic transaction may also include reading the corresponding LUT result. Therefore in some embodiments the atomic transaction may include (a) performing the lookup in the LUT, (b) reading the corresponding LUT result, and (c) clearing the flag. Steps (b) and (c) can be performed in any order. A process of moving a data record from a first shard to a second shard is explained with respect to FIGS. 11 to 14.

Figure 12:
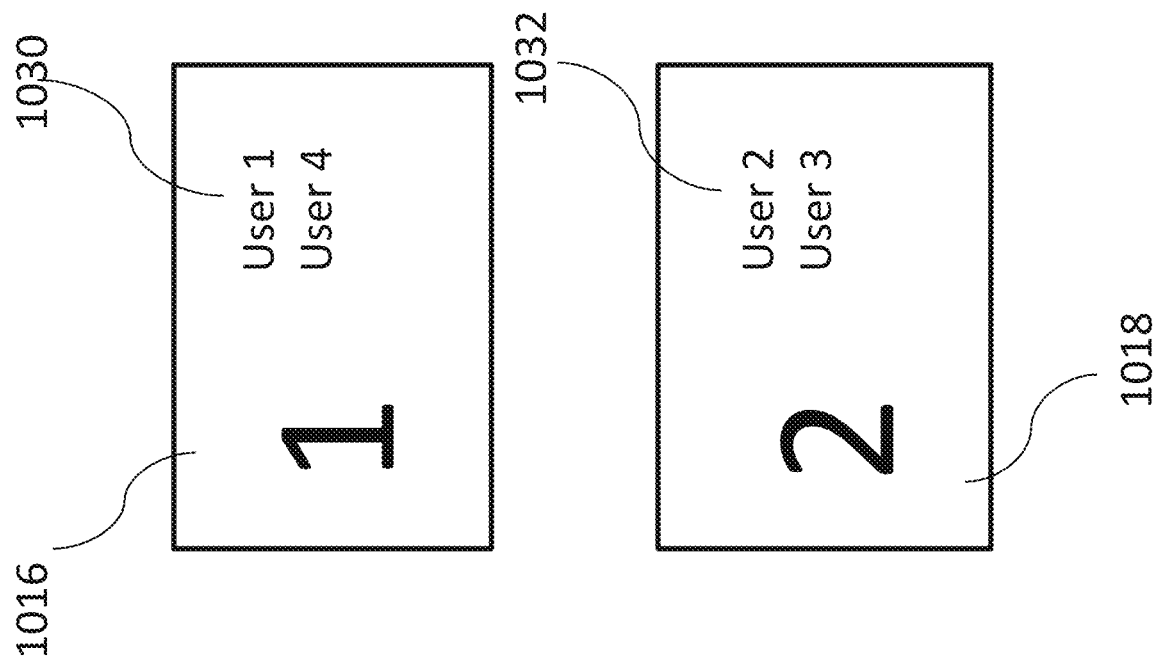
FIG. 12 shows a look-up table and associated database shards, according to an embodiment.

FIG. 12 shows an LUT 1000. A first shard, or "shard 1" is shown at 1016. As shown at 1030, shard 1 contains data collections for User 1 and User 4. A second shard, or "shard 2" is shown at 1018. Shard 2 contains data collections for User 2 and User 3, as shown at 1032.

Figure 11:
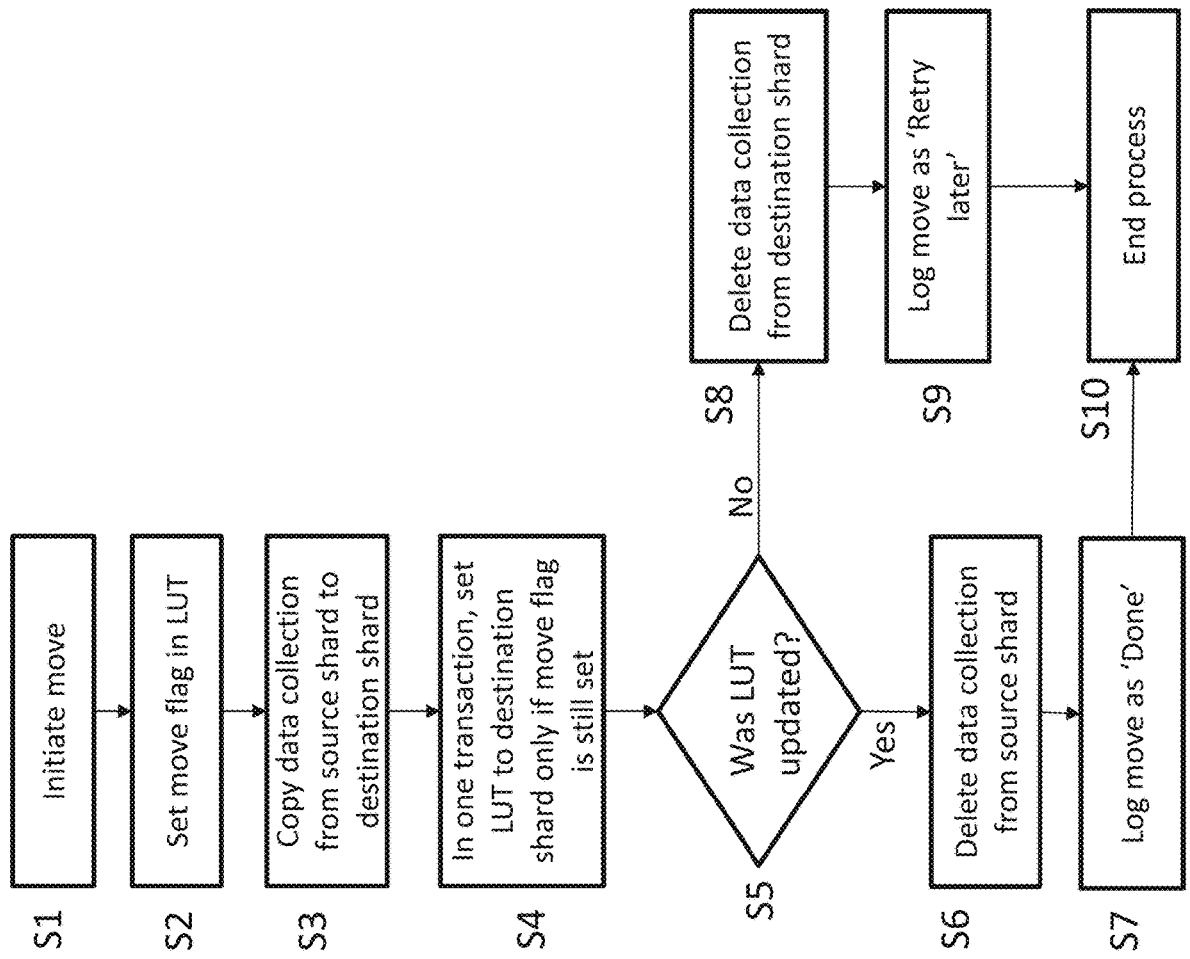
FIG. 11 is a flow chart according to an embodiment.

FIG. 11 is a flow chart showing a process of moving a data record or collection from a first (source) shard to a second (destination) shard. This method may be carried out by the Data Transfer Module (430).

At step S1, a moving process is initiated to move the data collection for user 1 from shard 1 to shard 2.

Figure 13:
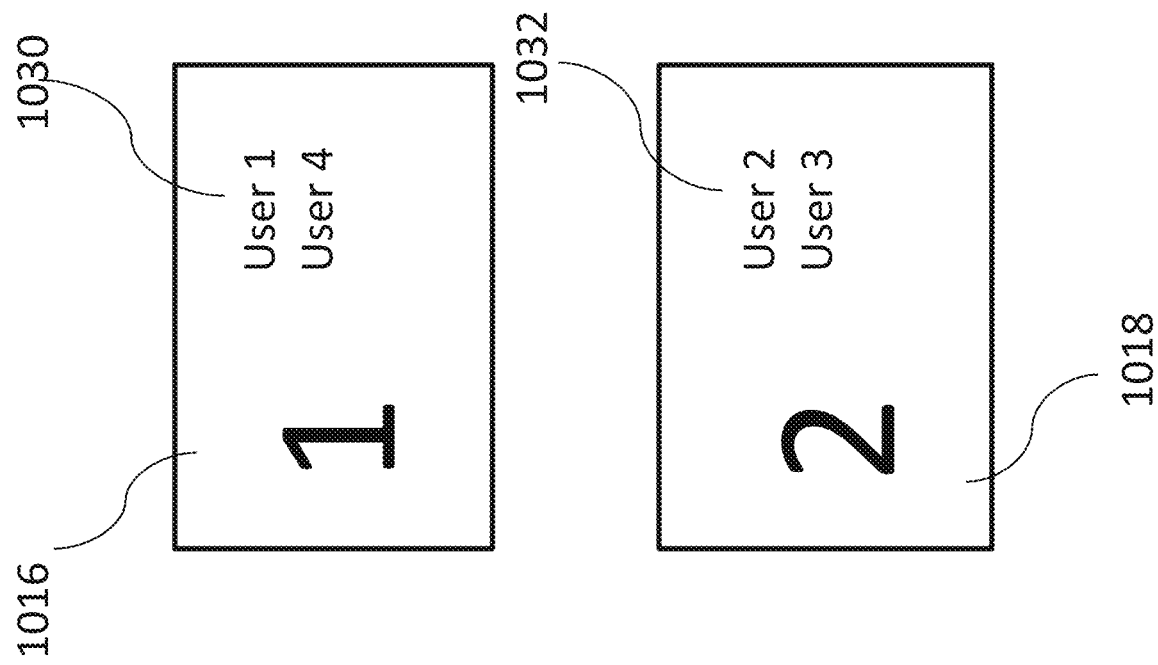
FIG. 13 shows a look-up table and associated database shards, according to an embodiment.

At step S2, a move flag is set in the LUT to show that the data collection for user 1 is in a process of being moved. For example, as shown in FIG. 13 the data collection location for user 1 has a move flag set.

At step S3, all data records that are part of the data collection for user 1 are copied from the first shard to the second shard. In some embodiments, any existing data records (for user 1) that may already exist on the second shard are deleted to ensure that the second shard contains an exact copy of data collection for user 1 from the first shard.

At step S4, an update is made to the LUT to change the displayed location for User 1 to the second shard. In embodiments this change is made to the LUT only if the move flag (which was set at step S2) is still set.

At step S5, the result of the previous operation is examined. If the LUT was updated, the flow continues to step S6. If the LUT was not updated, the flow continues to step S8. In other words, if the move flag has been cleared, step S8 is invoked, otherwise the flow continues to step S6.

At step S6, all data records that are part of the data collection for user 1 are deleted from the first shard. This is because it can be considered that the data collection has been successfully moved to the destination shard, and therefore it is safe to delete that data from the originating shard.

Figure 14:
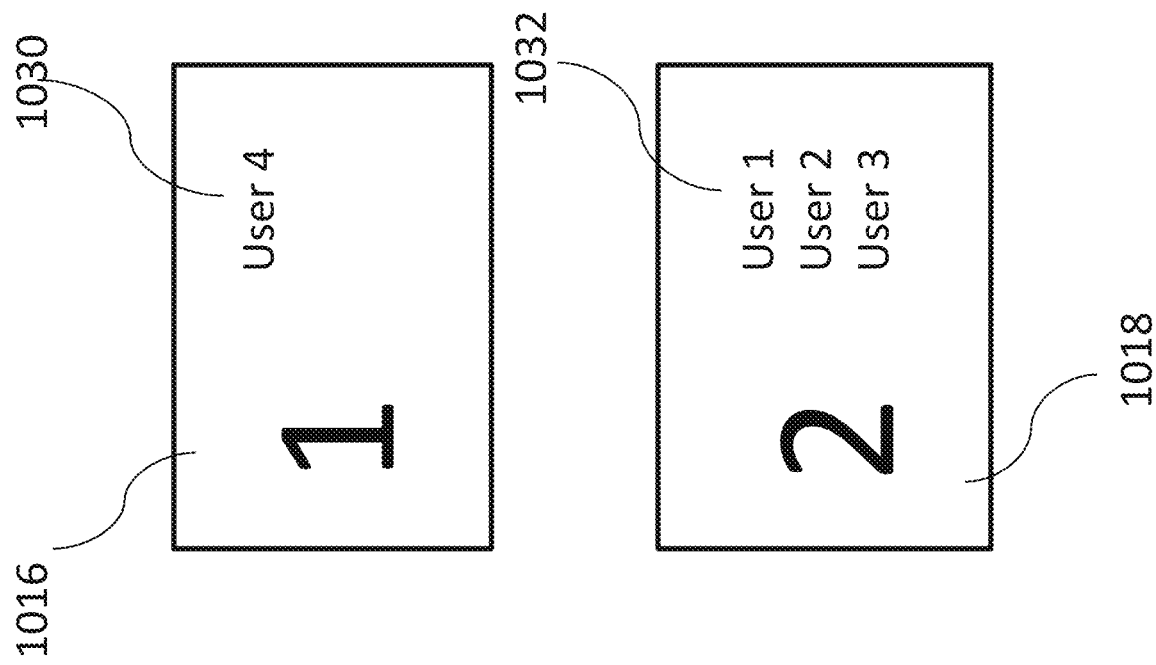
FIG. 14 shows a look-up table and associated database shards, according to an embodiment.

At step S7, it is logged that the data collection for user 1 was successfully moved from shard 1 to shard 2. FIG. 14 shows the outcome, where the data collection location for user 1 has been updated to show "2". Furthermore it can be seen that the second shard 1018 holds the data for User 1. At this point the move flag can also be removed, since the move has been completed.

At step S8 (which follows the "no" branch from step S5), all data records that are part of the data collection for user 1 are deleted from the second shard. For example, it may be the case that as part of the attempted move some records for the data collection of user 1 did manage to be copied over to the second shard, before the move had to be aborted for some reason. Any successfully copied records as part of an overall move failure of a collection are deleted.

At step S9, it is logged that the data collection for user 1 could not be moved. This may for example be due to attempted access to the data during the move. The move needs to be retried later.

At step S10 the moving process is ended.

Referring back to the outcome of step S4 of FIG. 11 (where a determination is made as to whether the LUT was updated), this may effectively comprise a determination as to whether a request was made for that data collection or sub-set of the data collection whilst it was being moved. If a request for the data collection or sub-set of the data collection was made during the moving process then the flag would have been removed, as per the flow chart of FIG. 10. If the flag is still present after the copying, then it can be determined that no request was made for the data collection or sub-set of the data collection whilst it was being moved.

Step S4, "set LUT to destination shard if and only if move flag is still set", may effectively be considered a determination of whether the indicator is in a first state (e.g. flag set) or a second state (e.g. flag not set). This determination is therefore carried out after the initiation of the transfer process. According to some embodiments, the determination of whether the indicator is in the first state or the second state is carried out a pre-determined time after the initiation of the transfer process. For example this may be a time considered to be sufficient for the transfer to have been completed. According to some embodiments, the determination of whether the indicator is in the first state or the second state is carried out in response to receiving a request for a data collection for which a move has been initiated.

The copy operation performed in step S3 can be realized in various ways. In one embodiment, the Data Transfer Module 430 itself reads the data records of data collection for User 1 from the first shard and then writes them to the second shard. In another embodiment, the Data Transfer Module 430 sends instructions to the first shard to push the data records to the second shard. In yet another embodiment, the Data Transfer Module 430 sends instructions to the second shard to pull the data records from the first shard.

In any of the above embodiments of the copy operation, as well as the delete operations described in step S3, step S6 and step S8, the process may consist of one or more sub-operations where a subset of the data records are processed and those sub-operations are performed until the whole operation has been completed.

According to embodiments, there is therefore no need to temporarily close down the database or lock-out users from the database while records are being moved. For example, if a request for a data record of user 1 is received whilst that data record is being moved, then that data record can still be retrieved from the originating shard at that point in time. The flag is removed so that subsequent requesters of that information look in the originating shard when they want that data record. This is because in such a case the originating shard may be considered the shard which contains the correct information. For example if the original requester wanted the data record so as to modify that data record in some way (e.g. to add or remove information), then following that modification in the originating shard the originating shard will contain the up to date (in this case modified) record, whilst the intended destination shard may then contain out of date information. As described above any data that has been copied to the destination shard can be deleted, in some embodiments.

As discussed above, when a data record is being moved within a database, the record is not deleted from its first location (e.g. first shard), until it has been confirmed that the data record has been successfully copied to the second location (e.g. second shard). In this way, if a transfer process is stopped or aborted part way through for any reason, then the information can still be obtained from the first location, and no information is lost due to the aborted transfer.

In some embodiments one or more data collections can be transferred in batches. For example data collections for users 1 to 100 can all be moved as part of a batch transfer. All collections in the batch can be moved to the same shard (e.g. all collections 1 to 100 can be moved to shard 2), or different data collections can be sent to different shards as part of the batch transfer (e.g. move collection 1 to shard 2, move collections 2 to 75 to shard 2, move collections 76 to 100 to shard 3 etc.).

It will be understood that a "transfer process" or "move process" may or may not include the actual successful transfer of the data collection. For example if the answer at step S5 in FIG. 11 is "No", then the transfer process may not include the actual transfer of the data collection (or the entirety of the data collection) from the originating shard to the destination shard.

Now referring back to FIG. 2, an embodiment will be considered where one (or more) Application Servers 220 handles requests from client device(s) 100, and where the application server contains the Data Access Module 320 (as per FIG. 3). In an embodiment the application server handles requests from a User X, but the actual access to the Data Access Module might be for multiple Users, so there is a User "fan-out" effect. For example, the User X is playing a game on a client device, and part of the game experience is to present User X with several other Users' game scores and level information, in this case for User A, User B and User C. Therefore the Application Server may invoke the Data Access Module 320 for User X, User A, User B and User C when serving game play for User X.

The use of caches is a well-known technique to reduce the load of databases. The caches may cache individual data records or groups of data records. The caches may cache data in a same format as retrieved from the database, or an alternative format (such as de-serialized), or a post-processed variant of the data. The caches may maintain an always up-to-date and consistent view of the data of the database, or a view of the data that might be several minutes old. The caches may be used to reduce a number of reads of data from the database, and/or the number of writes to the database. The caches may be central for all servers accessing the database, or they might be local to the server that accesses the database. The caches may be hierachial, where several caches of different types are used together in layers. The caches may be implicitly invoked, where the server doesn't know that a cache is used (instead of the database), or explicitly invoked, where the server explicitly chooses to use caches from some data. The data stored in caches may be explicitly invalidated, or the data may be invalidated based on the time it was stored in the cache, or the data may be invalidated based on a last time of access. Caches might be implemented as in-memory only, or based upon persistent storage.

Figure 15:
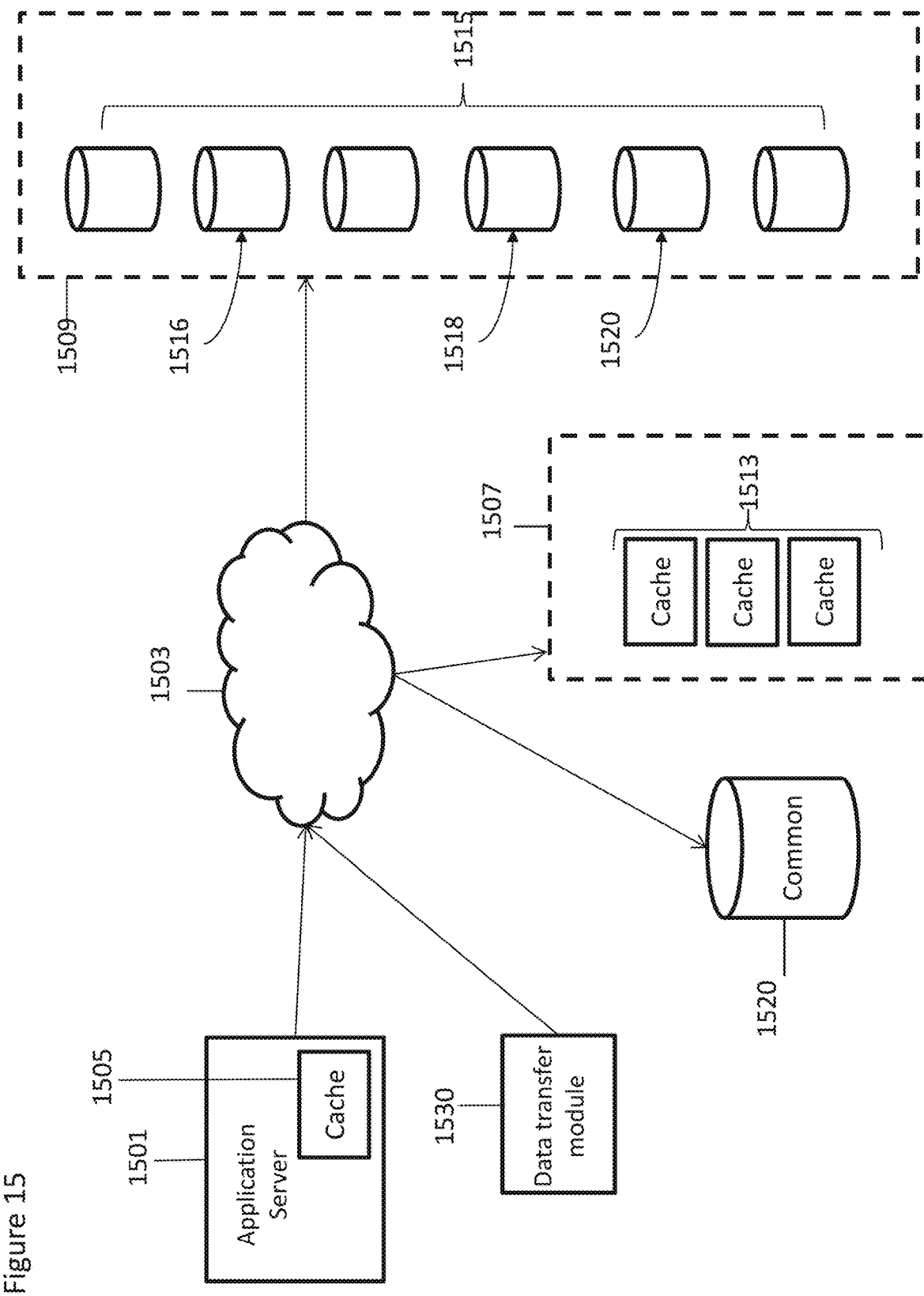
FIG. 15 shows an example system of an embodiment.

In an embodiment, a two layer cache system is used to reduce the load on the database data records of the data collections for the users. As shown in FIG. 15, there are two caches used, one local cache 1505 in each application server 1501, and one global cache 1507. In this embodiment the local cache has an insert expire time of 5 minutes, whereby any data stored in the cache will disappear after 5 minutes. The expiry time of 5 minutes is given by way of example only, and may be different in other embodiments. In this embodiment the global cache has an insert expiry time of 7 days, whereby any data stored will disappear after 10080 minutes. The expiry time of 7 days is given by way of example only, and may be different in other embodiments. The global cache 1507 comprises at least one server. In this embodiment the global cache 1507 comprises a plurality of servers 1513. The caches are used to reduce the number of reads from the database, and the application server explicitly stores and reads data from the caches via the Data Access Module. The data type may decide the cache policy. For example some data types may not be cached and some data types are cached.

The system may be considered to be hierarchical. The local cache may be considered to exist on a first level or layer. The global cache may be considered to exist on a second level or layer that is higher than the first level. In embodiments the Data Access Module addresses the caches by their hierarchical order. The database may be considered to exist on a third level or layer that is higher than the first and second levels. Information may be passed up the system in an ordered fashion, through the levels. For example a request may be received at the local cache on the first level. If the local cache does not have the necessary information in order to fulfil or answer the request, then the request is passed up to the global cache on the second level. If the global cache does not have the necessary information in order to fulfil or answer the request, then the request is passed up to the database on the third level. When the information is found, the lower layers can then get this information. This is shown by way of example in the flow-chart of FIG. 16.

Figure 16:
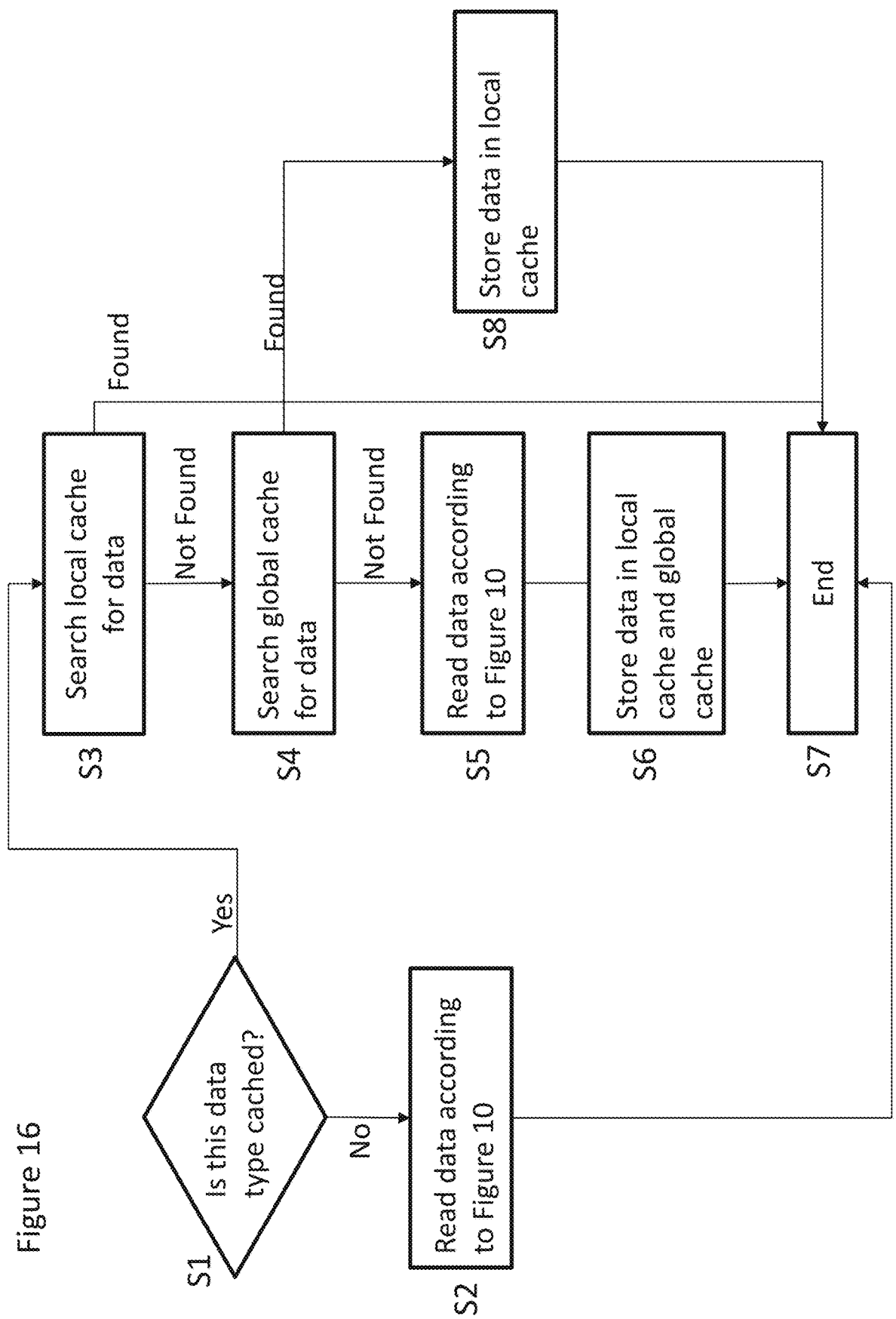
FIG. 16 is a flow chart of a method according to an embodiment.

Referring to FIG. 16, at step S1 a determination is made as to whether the user data has been cached or is of the type that is cached. This data may be the requested user data. If the determination at step S1 is "no" i.e. it is not cached data, then the step proceeds to step S2. The data can then be read in the manner as described with respect to FIG. 10. After this the method can proceed to step S7, where the method ends.

If, on the other hand, the requested data is cached data, then the determination at step S1 is "yes", and the method proceeds to step S3 where the local cache is searched for the necessary data. If the local cache has the necessary data, then the data can be provided to the requester and the method then proceeds to step S7 where the process ends. If the data cannot be found in the local cache, then the method proceeds to step S4 where the global cache is searched for the data. If the global cache has the data, then the method proceeds to step S8 where this data is also caused to be stored in the local cache, and the method then proceeds to step S7 where the process is ended. If the data cannot be found in the global cache, then the method proceeds to step S5 where the data is read from the database using the method according to FIG. 10. The data is then retrieved from the database, and at step S6 the data is also caused to be stored in the local cache and global cache. The method then proceeds to step S7 where the process ends.

If the information is changed by an operation, then the caches are also updated. For example, if a change is made to one or more records in the database, then the global cache (e.g. cache 1507) and the application server specific local cache (e.g. cache 1505) will be updated accordingly. This is shown by way of example in the flow chart of FIG. 17, which describes a process for an operation or operations that include changing data.

Figure 17:
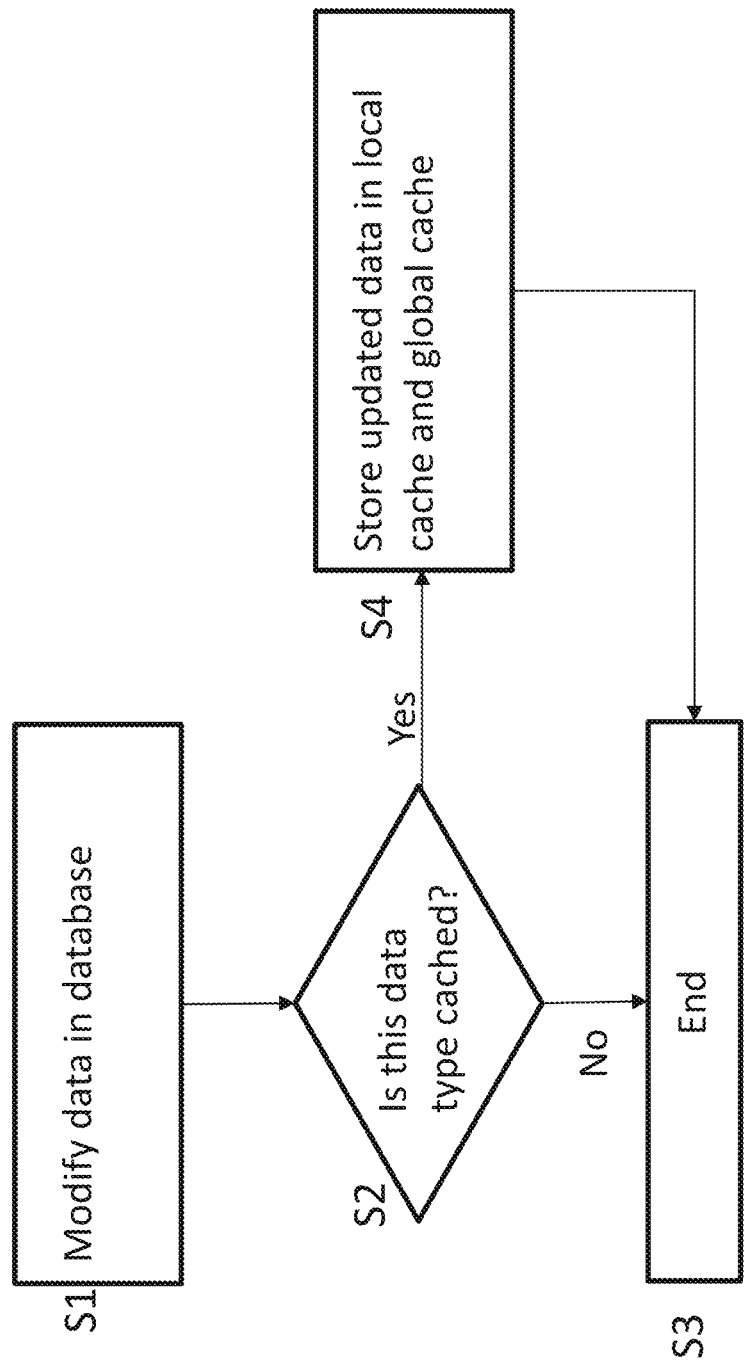
FIG. 17 is a flow chart of a method according to an embodiment.

As shown at step S1 of FIG. 17, data in the database is modified. This may for example be following a process as set out in the flowchart of FIG. 10. A result may also be returned from the database. At step S2, a determination is made as to whether this data type is cached. If the answer is "no", then the method proceeds to step S3 where the process is ended. If the answer at step S2 is "yes" (i.e. it is a cached data type), then the method proceeds to step S4 where the updated data is also stored in the local cache and the global cache. The method then proceeds to step S3 where the process is ended.

In some embodiments only the calling application server's (i.e. the application server which made the request) local cache is updated, and not the caches of the other application servers. This is a reason why the local cache has a relatively short expiry time. In embodiments the applicable game logic is configured to support that read requests of the cache(s) data types might return stale data.

In an alternative embodiment, the local cache and global cache perform an active role in the database access, and all database operations are performed via those caches. In such an embodiment the processes described in FIG. 16 and FIG. 17 are distributed between (see FIG. 15), the Data Access Module in 1501, the local cache 1505 and the global cache 1507.

Figure 18:
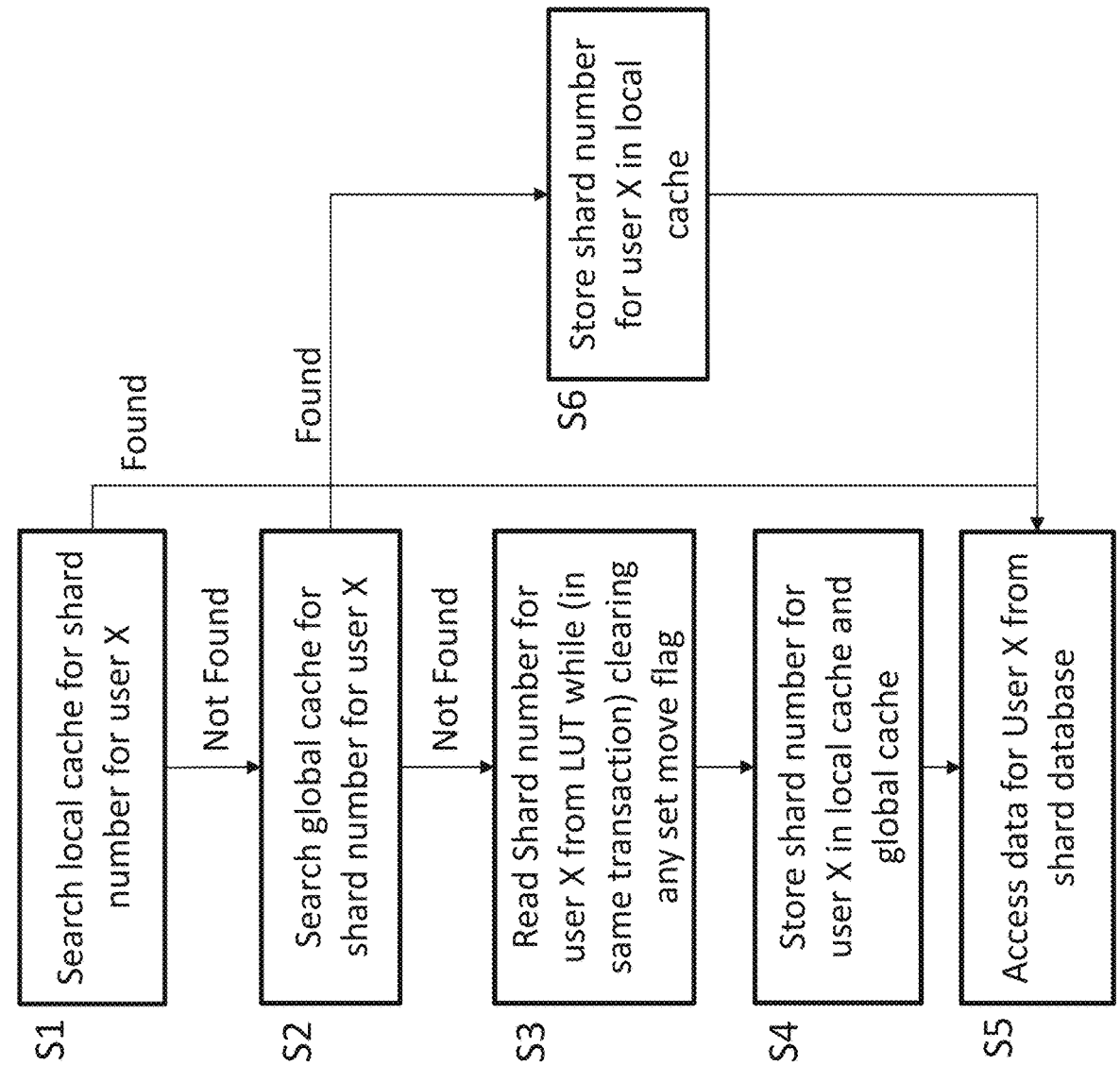
FIG. 18 is a flow chart of a method according to an embodiment.
Figure 19:
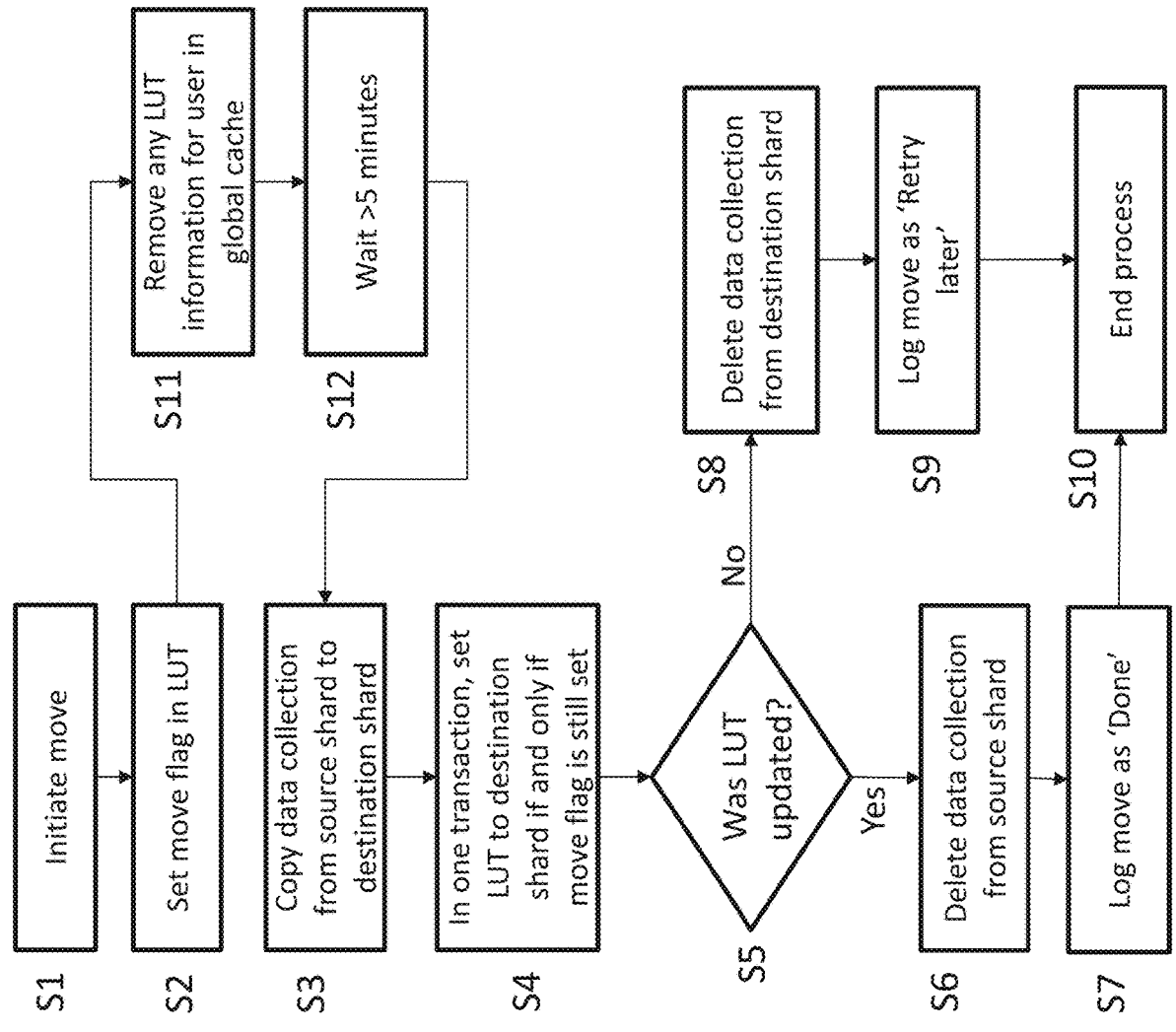
FIG. 19 is a flow chart of a method according to an embodiment.

An embodiment where caching is used for LUT information will now be described. In this embodiment, the LUT information is cached by a two layer cache system. This is used to reduce the load of the database for the stored LUT. In this embodiment there are two caches used, one local cache in each application server, and one global cache. In this example the local cache has an insert expiry time of 5 minutes, whereby any data stored in the cache will disappear after 5 minutes. In this example the global cache has an insert expiry time of 7 days, whereby any data stored will disappear after 10080 minutes. This embodiment may (or may not) be combined with the above described embodiment that caches the data records of the data collections for the user. Some embodiments combine some of the steps of the flows in FIG. 10 and FIG. 11. FIG. 18 may thus be considered to describe an updated flow for FIG. 10. FIG. 19 may be considered to describe an updated flow for FIG. 11.

FIG. 18 describes a method where a search is made for a shard number for a data of a particular user (in this example "user X"). At step S1 a local cache is searched for the shard number of user X. If this information is found in the local cache, then the method proceeds to step S5 where data for user X is accessed from the shard database, using the found shard number. If the data cannot be found in step S1, then the method proceeds to step S2 where the global cache is searched for the shard number for user X. If the shard number is found, then the process proceeds to step S6 where the found shard number for user X is also caused to be stored in the local cache, and then proceeds to step S5 where data for user X is accessed from the shard database, using the found shard number. If the shard number could not be found at step S2, then the process proceeds to step S3 where the shard number for user X is read from the LUT, and any associated move flag which is set is cleared as part of the same transaction. Then, at step S4 the shard number obtained from the LUT is stored in the local and global caches. Then, at step S5 data for user X is accessed from the shard database using the found shard number.

In FIG. 19 there are two additional steps compared with FIG. 11. For ease of comparison with FIG. 11 the numbering of the steps of FIG. 11 has been retained in FIG. 19, with the additional steps of FIG. 19 being given additional numbering. The further steps are described as follows:

At step S11 (which follows step S2) any LUT information for the user that might already exist in the global cache is removed.

At step S12 a pause or wait occurs. This waiting time may be pre-determined. This wait ensures that any LUT information for the user that might exist in any local cache will be expired and not used. Therefore in this embodiment the pause or wait is configured to be greater than the expiry time of the local cache (and therefore in this case greater than 5 minutes).

Step S11 and step S12 therefore effectively comprise flushing old information out of the cache layer, that might in alternative embodiments be released differently. For example, if the local caches could be remotely flushed, in other embodiments this could be performed in step S12 instead of waiting for the cache expiry time.

After step S12, the process continues with step S3, as shown in FIG. 19. For conciseness, a description of steps in common with FIG. 11 is not repeated here.

During the processing of step S11 or step S12, any invocation to the application might occur for the user that will use a cached LUT value (which might be stale). However the flow in FIG. 18 and the additional steps S11 and S12 in FIG. 19 will ensure that when step S3 occurs in FIG. 19 either:

Local cache and global cache don't contain any LUT information for the user.
Local cache or global cache might contain LUT information for the user, but the move flag (set in step S2) will not be set anymore, and it will therefore be ensured that step S8 in FIG. 19 will be invoked.

Therefore the LUT information can be cached in this embodiment, while supporting the move process of user data as previously described.

Referring back to the process illustrated in FIG. 10, there is a possibility that the application server calls for data records for a user. The data access module 320 may support "weak" lookups or "weak" data access. The game logic in the application server may choose to use the weak lookups. Normal data access may be considered to be a "strong" lookup or strong data access, which will cancel any data collection move that is in process. In contrast, the weak lookup will not cancel or abort a data collection move, instead it will return a specific failure response such as "Data currently not available". Such an embodiment will now be described with respect to FIG. 21. The process of FIG. 21 may therefore be considered an updated version of FIG. 10, where weak lookups are supported.

At step S1 a determination is made as to whether the application server data request is 'weak' or not. If not (i.e. the lookup is "strong"), the flow continues to step S2 and step S3, that are the same as steps S1 and S2 in FIG. 10.

Referring back to FIG. 21, if the lookup is determined to be weak, then the process proceeds from step S1 to step S4. At step S4, the shard number is requested from the LUT, but only if the move flag is not set.

At step S5, the outcome of step S4 is checked. If a result with a shard number was provided from the LUT (which by association confirms that there was no move flag), the flow continues to step S3.

Alternatively the process proceeds from step S5 to step S6 when the weak data lookup has failed. For example in this embodiment the weak lookup fails when the move flag is set for the requested user-data and therefore the shard number is not provided (or cannot be read). An appropriate action is performed to handle this outcome. For example a retry for that data may be made again after a certain period of time.

An embodiment will now be explained with an example from game play: The example game in question offers in-game messaging between friends as well as a high-score board per level between friends. If User X sends a message to User Y, the application server game logic updates User Y's inbox accordingly. During processing of the mail action from User X to User Y, the data access module is requested to update User Y data (read: inbox). Since sending an in-game message is an explicit action, this would not use a weak lookup. Instead any such action would cancel any ongoing shard move of User Y data. The example game may also offer a high-score board showing the player's friends. When the application server generates the high-score board for User X for a specific level, it requests all User X's friends' data from that level from the data module. In this case, the application server game logic may choose to use a weak lookup, and if User Y has an ongoing shard move (the move flag is set), then the move process for User Y will be allowed to continue. Accordingly score data for User Y may not be accessible at that time and will not be included in the high-score board calculations.

Therefore a weak lookup may be considered a lookup for information that is of a relatively low importance. A strong lookup may be considered a lookup for information of higher importance. In some embodiments a weak lookup for user data will not cause a move of that data that is in progress to be halted. Or in other words a weak lookup permits an in-progress move to be continued.

Likewise it may also be considered that a strong lookup for user data will cause an in-progress move of that data to be halted, so that the data can be retrieved.

This weak lookup support may reduce the number of shard moves that are aborted, (for example following step S8 in FIG. 11). The possibility that the data requested by the weak lookup may sometimes not be available may be considered an acceptable trade-off.

Figure 25:
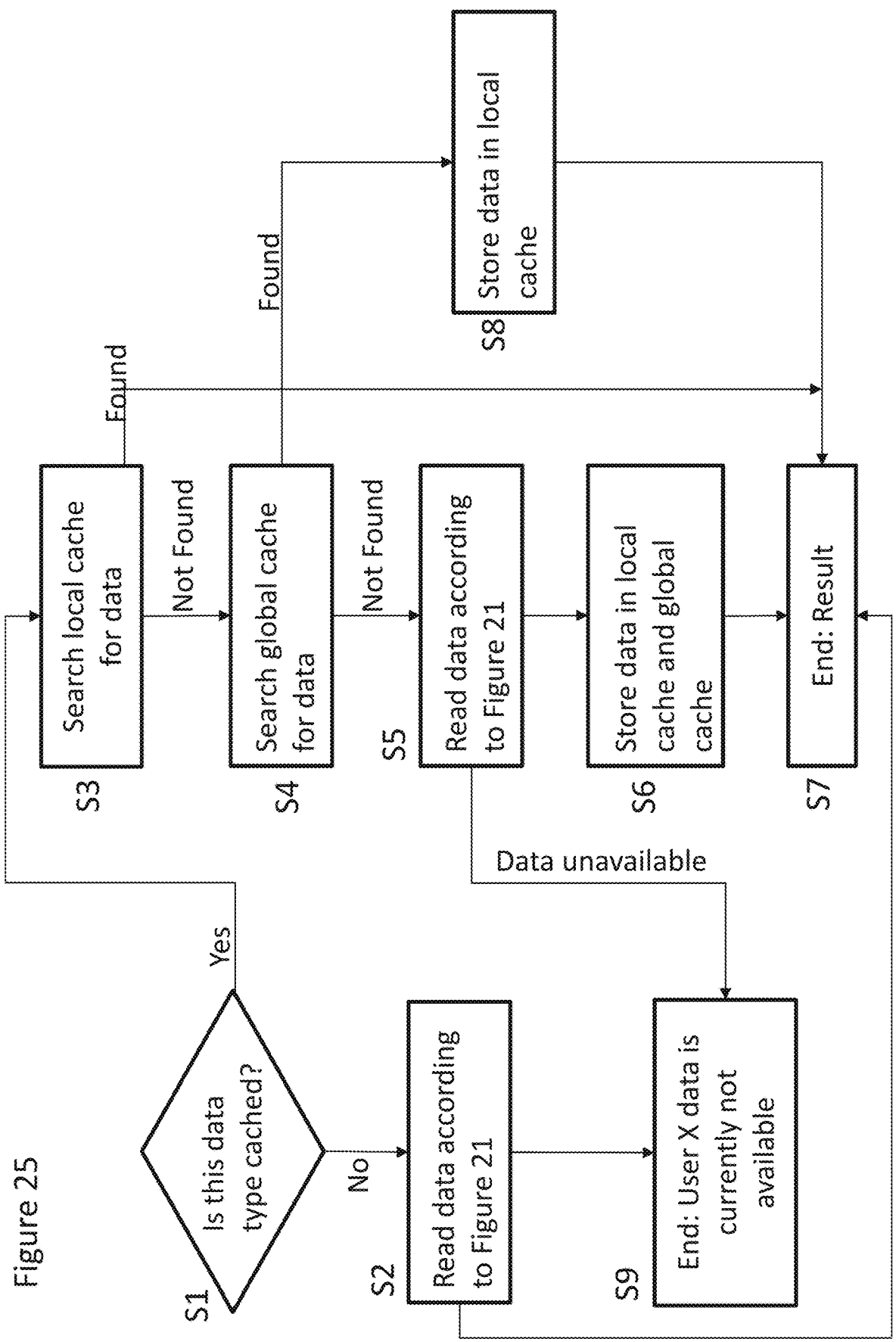
FIG. 25 is a flow chart of a method according to an embodiment.

The concept of weak lookups can also be incorporated in any of the previously described embodiments. For example the weak lookup can be combined with the scenarios where the LUT is cached. For example, the flow chart of FIG. 16 explains a process of how a request is passed up through cache layers in order to retrieve required information. Steps S2 and S5 of FIG. 16 are "Read data according to FIG. 10". FIG. 25 is a modification of the flow chart of FIG. 16, where in the flow chart of FIG. 25 strong/weak look-ups are incorporated. In comparison with FIG. 16, steps S2 and S5 of FIG. 25 are instead "Read data according to FIG. 21" (i.e. the strong/weak lookup method). If, during these steps it is determined that a move flag is set and the lookup is weak, then the method of retrieving that user data may be halted at that point. Also, an additional step S9 is added, whereby the method is ended if it is determined that user data that is being requested is not available For example, and referring back to FIG. 25, at step S1 a determination is made as to whether the user data has been cached or is of the type that is cached. This data may be the requested user data. If the determination at step S1 is "no" i.e. it is not cached data, then the method proceeds to step S2. In this case, step S2 uses the method of FIG. 21. The method then either proceeds to step S7, where the process is ended with data being provided to the requester. If the user data isn't available, the method proceeds to step S9.

Figure 21:
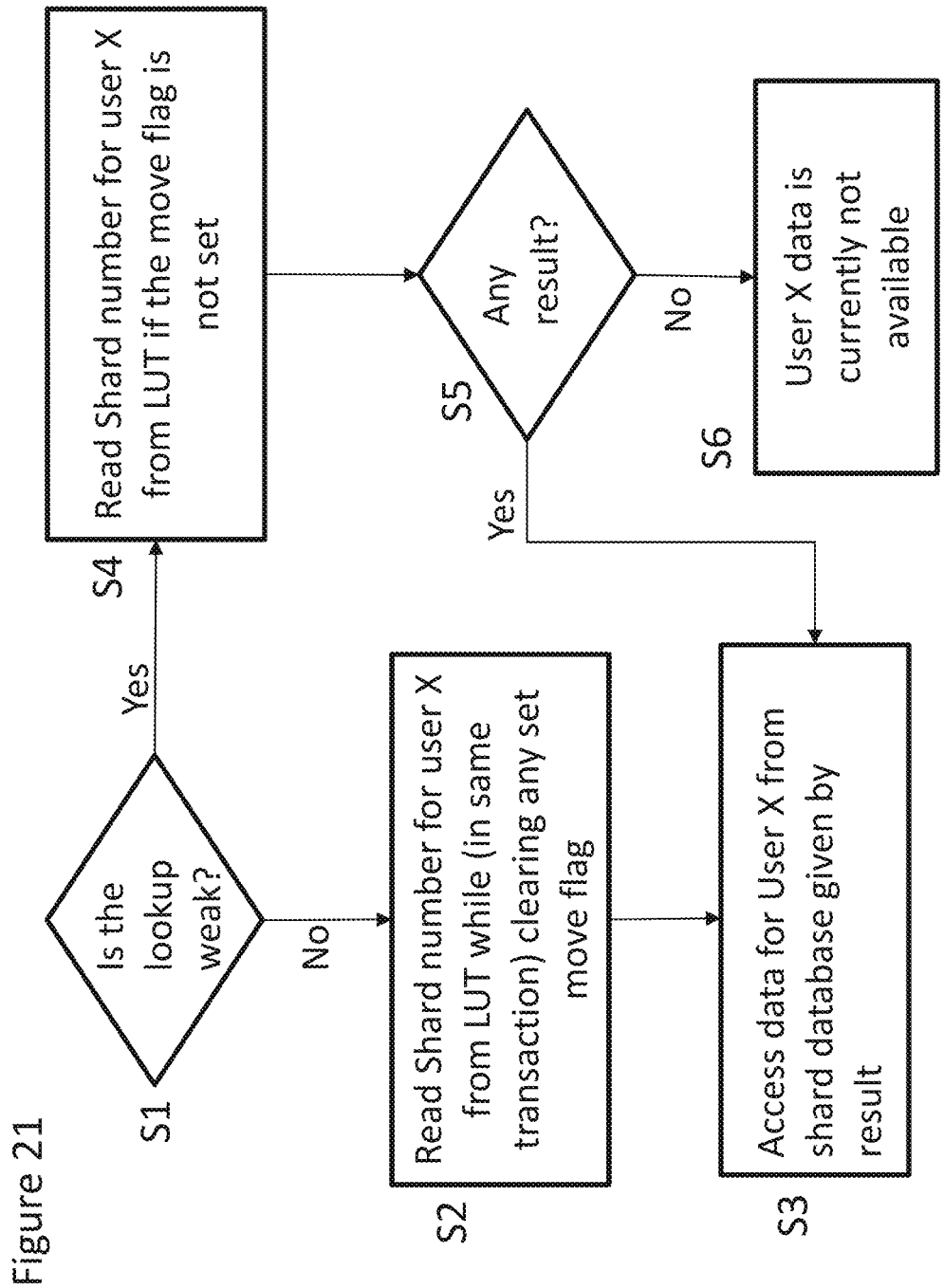
FIG. 21 is a flow chart of a method according to an embodiment.

In a similar fashion, at step S5, when strong/weak look-ups are supported the data is read according to the flow chart of FIG. 21. The method can either then proceed to step S6, or if the user data isn't available, the method proceeds to step S9 thereby not caching the read data outcome.

In some embodiments the database is divided into a common database and several shard databases. It will be understood that the database(s) can be realised in a number of other different ways. In one alternative embodiment, the common database is itself formed of a number of shards. For example an alternative shard algorithm may be used, which stores LUT for users 1-99999 on common database shard 1, stores LUT for user 100000-199999 on common database shard 2, and so on. In another alternative embodiment, each of the common database and shard databases are realised by a separate master and slave database, connected by replication. In another alternative embodiment, each of the common database and shard databases are realised by a set of n master databases, connected by replication. In another alternative embodiment, several of the common database and shard databases may be co-located on the same database server. For example shards 1-4 may be located in database server A, shards 5-8 may be located in database server B, and so on.

All of the three alternative embodiments described above can also be combined in any way.

In the embodiments described above, a number of possible move flags N has been the same as a number of corresponding LUT entries M. However, in some embodiments, the number of possible move flags N can be anything from one to M, such as $M=<N=<1$. Where the number of move flags is less than the number of LUT entries then the storage needed for the possible move flags may also be correspondingly less. This also allows a degree of control over how often moves are aborted. If fine control is required then N can be set to be equal to M, or at least close thereto. If less fine control is required then N can be set to be less (even substantially less in some embodiments), although this may result in more shard moves being aborted.

FIG. 22 shows an embodiment of a LUT with move flags where N is approximately M/2. In this embodiment every odd and even user (based upon user identifier) shares the same possible move flag.

Lookup for User 0 and User 1 share one possible move flag, and in this example the flag is not set.

Lookup for User 2 and User 3 share one possible move flag, and in this example the flag is set.

Lookup for User 4 would share a possible move flag with User 5, that in this example is set, but in this example User 5 doesn't exist.

Lookup for User 6 and User 7 share one possible move flag, and in this example the flag is not set.

In this example, data for User 2 and User 4 is currently being moved between shards, and accordingly their move flags are set. Should an activity occur with respect to User 3, that would abort the shard move for User 2, even if no activity has occurred for User 2.

Figure 23:
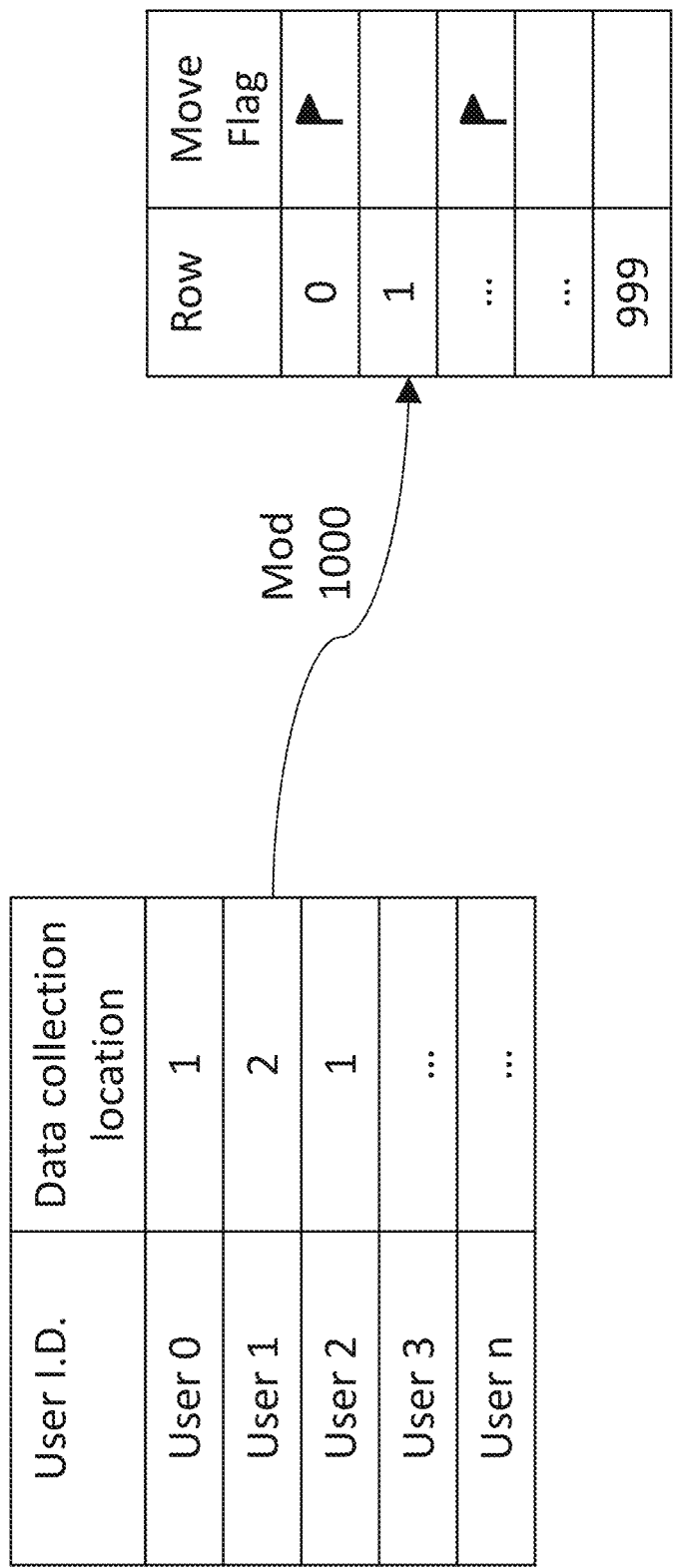
FIG. 23 shows a look-up table according to an embodiment.

FIG. 23 shows an embodiment of a LUT with move flags where N (number of move flags) is static 1000 independent of M (number of LUT entries). That is in this embodiment the number of move flags remains constant, and is independent of the number of LUT entries. See FIG. 23, where left table is open-ended "User n", but right table is closed-ended ("999"). A calculation of which move flag belongs to which user is based upon the modulus operation of 1000. That is, User 0 gets move flag location 0, User 1 gets move flag location 1, and so on, but User 1000 also gets move flag location 0.

In this case, User 0, User 1000, User 2000 and so on belong to a group that share the same move flag. Any activity from any of the users in such a group will abort any shard move operation for any user in the same group.

In alternative embodiments other operations, such as hash, can be used.

In an extreme case, N can be 1. Then any user activity would abort any shard move.

Figure 20:
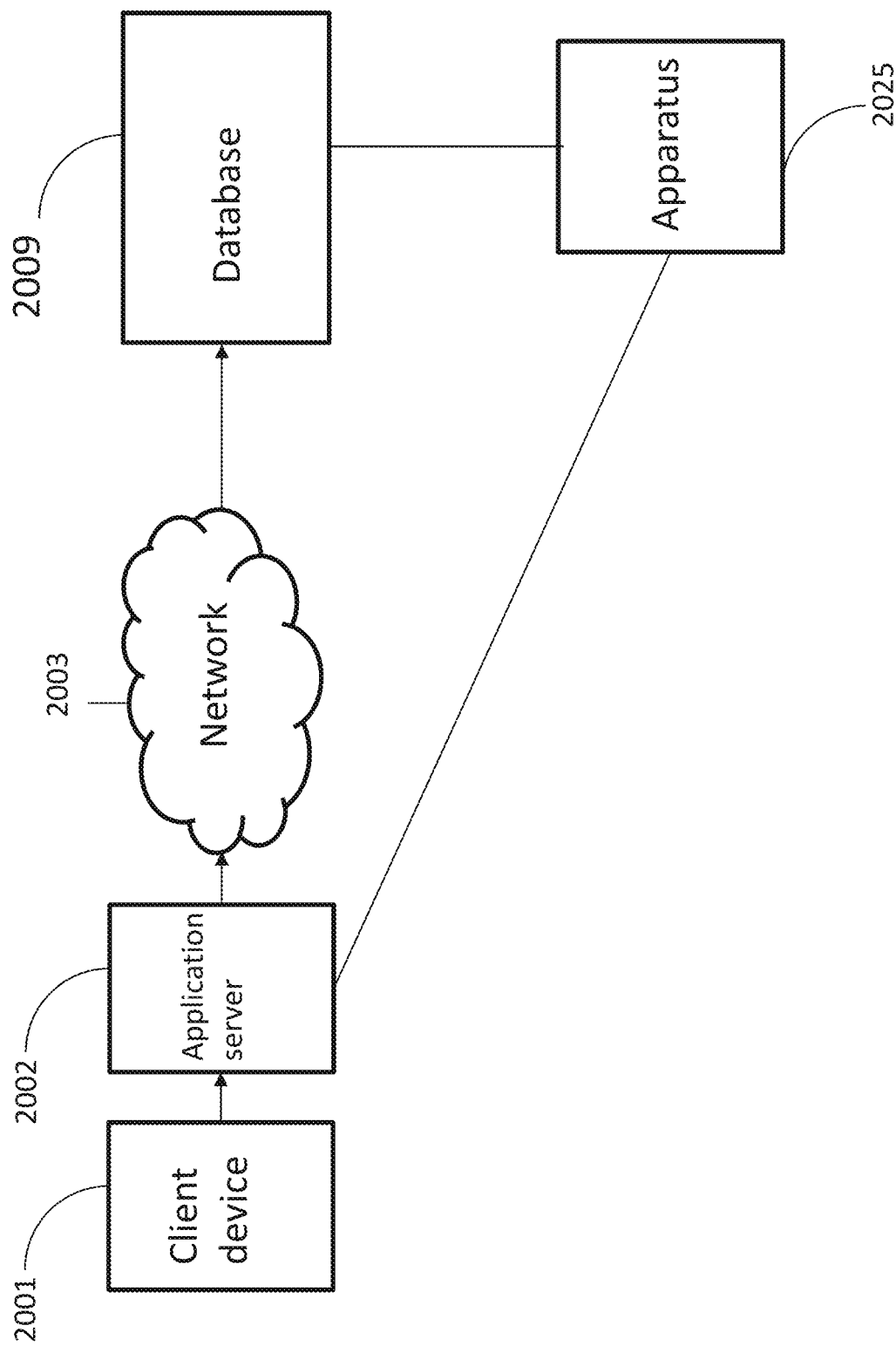
FIG. 20 is an example system according to an embodiment.

In some embodiments, one or more separate apparatus may be provided to carry out some of the operations. This is shown for example in FIG. 20 which shows a client device 2001 connected to a database 2009 via network 2003 and application server 2002. A further apparatus 2025 is shown, which is in communication with database 2009. In some embodiments this apparatus 2025 may also be in communication with application server 2002. In some embodiments, the apparatus 2025 is configured to carry out at least some of the tasks described above. Some of the tasks which may be carried out by the apparatus 2025 include one or more of: receiving requests for data records; modifying data records; causing the LUT(s) to be updated; retrieving data records from the shards; modifying data records from the shards; transmitting data records to a requester etc. The apparatus 2025 may therefore be considered an intermediary. In some embodiments the apparatus 2025 is comprised in the database 2009.

The method may take place across one or more apparatus. For example the request for a location of a data record may be received at a common database (or a cache), and the actual transfer of the data record will take place between the shards (which in some embodiments are not the common database itself).

In some embodiments the actual transfer of data from the first shard to the second shard cannot be aborted once the transfer has begun (as explained above the actual transfer of the data can be considered a sub-process of the overall moving process).

Whilst some embodiments have been described in which information is retrieved from the database in response to a request, it will be appreciated that the described methods can also be used in order to modify information in the database. In the context of a game (by way of example only), after a player has completed a game or a game level, then information such as a points score, number of lives remaining etc. may need to be modified in the database. The previously described methods can be used in order to determine in which shard the relevant data record or collection is located so that the information can be modified thereto.

Various embodiments of methods and devices have been described in the foregoing. It should be appreciated that such may be implemented in apparatus, where the apparatus is implemented by any suitable circuitry. Some embodiments may be implemented by at least one memory and at least one processor. The memory may be provided by memory circuitry and the processor may be provided by processor circuitry. Some embodiments may be provided by a computer program running on the at least one processor. The computer program may comprise computer implemented instructions which are stored in the at least one memory and which may be run on the at least one processor.

It is also noted herein that there are several variations and modifications which may be made to the disclosed solution without departing from the scope of the present disclosure.

The invention claimed is:

1. A method of migrating data between a first database location and a second database location of a computer implemented database, the method comprising:
    storing in at least one memory in at least one server, a look-up table comprising respective location values of a plurality of data collections stored in said computer implemented database, wherein a respective location value indicates a respective first location within the computer implemented database where an associated data collection is stored, wherein when access to a respective data collection is required, a look up request is performed with respect to the look up table for the respective location value for said respective data collection;
    providing at least a part of the look-up table to a first cache;
    storing by at least one processor, in the look-up table which is stored in the at least one memory in said at least one server, an indicator for each of said data collections being migrated in response to initiation of a respective data migration process of one or more of said data collections from a respective first database location to a respective second database location, wherein the indicator indicates the initiation of the data migration process for a respective data collection;
    causing information associated with the data collections being migrated to be removed from the at least a part of the look-up table in the first cache; and
    at an end of a data migration process for a given data collection, determining if the location value of the given data collection in the look-up table which is stored in the at least one memory in said at least one server is to be updated to the second database.

2. The method of claim 1, comprising receiving a look up request for a location of at least one data collection after said initiation of the respective data migration process has been initiated.

3. The method of claim 2, comprising removing the indicator associated with the at least one data collection in response to receiving the look up request for the location of the at least one data collection.

4. The method as claimed in claim 2, comprising determining based on a type of the look up request if a modification is to be made to said indicator.

5. The method as claimed in claim 4, comprising when it is determined that that said indicator is to be modified, modifying the indicator by one of removing said indicator and changing the indicator to a different state to one which indicates the initiation of the data migration process for the given data collection.

6. The method as claimed in claim 4, wherein said determining if a modification is to be made to said indicator is dependent on if the look up request is associated with a read or if the look up request is associated with a write.

7. The method as claimed in claim 6, wherein the write request comprises a request to update at least part of the data associated with the one of the plurality of data collections being migrated, and wherein the read request comprises a request that does not update at least part of the data associated with the one of the plurality of data collections being migrated.

8. The method of claim 1, wherein at least one indicator associated with the data collections being migrated is shared by one or more data collections.

9. The method as claimed in claim 8, wherein for N data collections, M indicators are provided, wherein M is less than N, and wherein M is selected based on an expected frequency of look-up requests.

10. The method as claimed in claim 1, wherein the first cache comprises one of a local cache and a global cache.

11. The method as claimed in claim 1, wherein the first cache comprises a local cache and the method comprises providing at least a part of the look up table to a global cache.

12. The method of claim 1, wherein in response to receiving the lookup request, routing the lookup request to the look-up table stored in the first cache.

13. The method of claim 1, wherein the first cache is configured to delete data stored in the first cache after expiry of a predetermined time period, and wherein the method comprises copying one or more of the data collections being migrated from the respective first location to the respective second location, wherein the copying is performed after expiry of the predetermined time period.

14. The method of claim 1, comprising causing at least a part of the look-up table to be stored in a global cache, wherein the lookup request is routed to the look-up table stored in the global cache in response to the look-up table stored in the first cache not having data necessary for fulfilling the lookup request.

15. The method of claim 11, comprising causing removal of the respective location values associated with each of the data collections being migrated from the at least a part of the look-up table stored in the global cache in response to the initiation of the data migration process.

16. The method of claim 1, comprising at the end of a data migration process for the given data collection, determining that the location value of the given data collection in the look-up table which is stored in the at least one memory in said at least one server is to be updated to indicate the second database if the look up table has an indicator indicating the initiation of the data migration process for the given data collection.

17. An apparatus comprising at least one memory and at least one processor, the at least one memory storing computer executable instructions which, when run by the at least one processor, cause the apparatus to:
store in the at least one memory, a look-up table comprising respective location values of a plurality of data collections stored in said computer implemented database, wherein a respective location value indicates a respective first location within the computer implemented database where an associated data collection is stored, wherein when access to a respective data collection is required, a look up request is performed with respect to the look up table for the respective location value for said respective data collection;
provide at least a part of the look-up table to a first cache;
store, in the look-up table, an indicator for each of said data collections being migrated in response to initiation of a respective data migration process of one or more of said data collections from a respective first database location to a respective second database location, wherein the indicator indicates the initiation of the data migration process for a respective data collection;
cause information associated with the data collections being migrated to be removed from the at least a part of the look-up table in the first cache; and
at an end of a data migration process for a given data collection, determine if the location value of the given data collection in the look-up table which is stored in the at least one memory in said at least one server is to be updated to the second database.

18. The apparatus of claim 17, wherein the at least one processor causes the apparatus to receive a look up request for a location of at least one data collection after said initiation of the respective data migration process has been initiated.

19. The apparatus as claimed in claim 17, wherein the first cache comprises one of a local cache and a global cache.

20. The apparatus as claimed in claim 17, wherein the first cache comprises one of a local cache and a global cache.

21. The apparatus as claimed in claim 17, wherein the first cache comprises a local cache and the at least one processor causes the apparatus to provide at least a part of the look up table to a global cache.

22. The apparatus of claim 17, wherein the at least one processor causes the apparatus to route the lookup request to the look-up table stored in the first cache in response to receiving the lookup request.

23. The apparatus of claim 17, wherein the at least one processor causes the apparatus to:
delete data stored in the first cache after expiry of a predetermined time period; and
copy each of the data collections being migrated from the respective first location to the respective second location, wherein the copying is performed after expiry of the predetermined time period.

24. The apparatus of claim 17, wherein the at least one processor causes the apparatus to:
cause at least a part of the look-up table to be stored in a global cache;
route the lookup request to the look-up table stored in the global cache in response to the look-up table stored in the first cache not having data necessary for fulfilling the lookup request; and
cause the respective location values associated with each of the data collections being migrated to be removed from the look-up table stored in the global cache in response to the initiation of the data migration process.

25. A computer program product comprising computer executable instructions which, when run by at least one processor, cause an apparatus to:
store in at least one memory, a look-up table comprising respective location values of a plurality of data collections stored in said computer implemented database, wherein a respective location value indicates a respective first location within the computer implemented database where an associated data collection is stored, wherein when access to a respective data collection is required, a look up request is performed with respect to the look up table for the respective location value for said respective data collection;
provide at least a part of the look-up table to a first cache;
store, in the look-up table, an indicator for each of said data collections being migrated in response to initiation of a respective data migration process of one or more of said data collections from a respective first database location to a respective second database location, wherein the indicator indicates the initiation of the data migration process for a respective data collection;
cause information associated with the data collections being migrated to be removed from the at least a part of the look-up table in the first cache; and
at an end of a data migration process for a given data collection, determine if the location value of the given data collection in the look-up table which is stored in the at least one memory in said at least one server is to be updated to the second database.

* * * * *